(12) United States Patent
Gordon et al.

(10) Patent No.: US 12,128,313 B2
(45) Date of Patent: *Oct. 29, 2024

(54) TRAINING ACTION PREDICTION MACHINE-LEARNING MODELS FOR VIDEO GAMES WITH HEALED DATA

(71) Applicant: Electronic Arts Inc., Redwood City, CA (US)

(72) Inventors: William Gordon, Apopka, FL (US); Kasey Keltner, Rogersville, MO (US); Shawn Leaf, Winter Garden, FL (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,621

(22) Filed: Aug. 17, 2023

(65) Prior Publication Data

US 2023/0390646 A1 Dec. 7, 2023

Related U.S. Application Data

(63) Continuation of application No. 17/710,260, filed on Mar. 31, 2022, now Pat. No. 11,786,822.

(51) Int. Cl.
*A63F 13/67* (2014.01)
*A63F 13/57* (2014.01)

(52) U.S. Cl.
CPC .............. *A63F 13/67* (2014.09); *A63F 13/57* (2014.09); *A63F 2300/6027* (2013.01)

(58) Field of Classification Search
CPC ... A63F 13/67; A63F 13/57; A63F 2300/6027

USPC .......................................................... 463/42
See application file for complete search history.

(56) References Cited

U.S. PATENT DOCUMENTS 10,357,718 B2 * 7/2019 Aghdaie ................. A63F 13/79
11,179,637 B2 11/2021 Yang

FOREIGN PATENT DOCUMENTS

CA 3120410 A1 5/2020

* cited by examiner

*Primary Examiner* — Allen Chan
(74) *Attorney, Agent, or Firm* — Gray Ice Higdon

(57) ABSTRACT

This specification provides a computer-implemented method, the method comprising obtaining a machine-learning model. The machine-learning model is being trained with expert data comprising a plurality of training examples. Each training example comprises: (i) game state data representing a state of a video game environment, and (ii) scored action data representing an action and a score for that action if performed by a video game entity of the video game environment subsequent to the state of the video game environment. An action is performed by the video game entity based on a prediction for the action generated by the machine-learning model. The method further comprises determining whether the action performed by the video game entity was optimal. In response to determining that the action performed by the video game entity was suboptimal, a healed training example is generated. The healed training example comprises: (i) the state of the instance of the video game environment, and (ii) healed scored action data indicative that the action performed by the video game entity was suboptimal. The machine-learning model is updated based on the healed training example.

20 Claims, 10 Drawing Sheets

TRAINING ACTION PREDICTION MACHINE-LEARNING MODELS FOR VIDEO GAMES WITH HEALED DATA

BACKGROUND

In many video games, it is desirable to generate predictions (e.g. scores) for actions that entities (e.g. non-player characters) can perform in a video game environment, thus enabling a video game entity to be controlled without input by a player of the video game. However, existing methods may be computationally expensive, and as such, may impact game performance (e.g. frames per second) and are not suitable for use when the video game is being played by a player on their computing device. Furthermore, some methods may be incapable of (or less than optimal or otherwise unsuitable for) adapting to changes in the video game environment and may generate stale, outdated and/or less than optimal action predictions which are only suitable for previous versions of a game environment.

SUMMARY

In accordance with a first aspect, this specification provides a computer-implemented method, the method comprising obtaining a machine-learning model. The machine-learning model is being trained with expert data comprising a plurality of training examples. Each training example comprises: (i) game state data representing a state of a video game environment, and (ii) scored action data representing an action and a score for that action if performed by a video game entity of the video game environment subsequent to the state of the video game environment. The method further comprises, in an instance of the video game environment comprising the video game entity, determining a state of the instance of the video game environment. A prediction is generated for each of one or more actions that the video game entity can perform in relation to the state of the instance of the video game environment. The generating comprises processing input data using the trained machine-learning model. The input data comprises a representation of the state of the instance of the video game environment. An action is performed by the video game entity based on one of the generated predictions. The method further comprises determining whether the action performed by the video game entity was optimal. In response to determining that the action performed by the video game entity was suboptimal, a healed training example is generated. The healed training example comprises: (i) the state of the instance of the video game environment, and (ii) healed scored action data indicative that the action performed by the video game entity was suboptimal. The machine-learning model is updated based on the healed training example.

In some implementations, the expert data was obtained from a simulation-based artificial intelligence controlling the video game entity in the video game environment.

In some implementations, the input data comprises positional information for the video game entity. The input data may further comprise positional information for each of one or more additional video game entities.

In some implementations, the generated prediction for each of one or more actions that the video game entity can perform in relation to the state of the instance of the video game environment comprises a score for the respective action that the video game entity can perform. Generating the healed training example may comprise adjusting the score for the performed action to form the healed scored action data. Performing, based on one of the generated predictions, the action by the video game entity may comprise selecting an action with the highest score, and performing the selected action.

In some implementations, the machine-learning model comprises a neural network. The neural network may be a convolutional neural network.

In some implementations, the machine-learning model is being trained with the expert data using imitation learning.

In some implementations, the method further comprises compressing the updated machine-learning model by quantizing weights of the updated machine-learning model from a higher-bit value to a lower-bit value.

In some implementations, the method further comprises iteratively collecting a plurality of healed training examples from a plurality of instances of the video game environment. Updating the machine-learning model may further comprise updating the machine-learning model based on one or more of the collected plurality of healed training examples.

In some implementations, the method further comprises compressing the trained machine-learning model by quantizing weights of the trained machine-learning model from a higher-bit value to a lower-bit value. The compressed trained machine-learning model may be used for generating the prediction for each of the one or more actions that the video game entity can perform in relation to the state of the instance of the video game environment. A plurality of healed training examples may be collected from a plurality of instances of the video game environment using the compressed trained machine learning model for generating the predictions in relation to the actions performed by the video game entity. The compressed trained machine-learning model may be updated based on one or more of the collected plurality of healed training examples.

In some implementations, updating the trained machine-learning model further comprises updating the trained machine-learning model based on a combination of expert data and one or more of collected plurality of healed training examples.

In some implementations, determining whether the action performed by the video game entity was optimal comprises determining whether the action performed by the video game entity was successful. The healed training example may be generated in response to determining that the action performed by the video game entity was unsuccessful.

In some implementations, deploying the updated machine learning model for replacing a current version of a machine learning model or AI being used with the video game entity.

In accordance with a second aspect, this specification provides a non-transitory computer-readable medium, which when executed by a processor, cause the processor to: obtain a machine-learning model, the machine-learning model comprising a plurality of weights, wherein the machine-learning model was trained using expert data comprising a plurality of training examples, each training example comprising: (i) game state data representing a state of a video game environment, and (ii) scored action data representing an action and a score for that action if performed by a video game entity of the video game environment subsequent to the state of the video game environment; for each of one or more model compression iterations: compress the trained machine-learning model, comprising quantizing the weights of the trained machine-learning model from a higher-bit value to a lower-bit value; in an instance of the video game environment comprising the video game entity: determine a state of the instance of the video game environment; generate a prediction for each of one or more actions that the video game entity can perform in relation to the state of the instance of the video game environment, the generating comprising processing input data using the compressed machine-learning model, wherein the input data comprises a representation of the state of the instance of the video game environment; perform, based on one of the generated predictions, an action by the video game entity; and determine whether the action performed by the video game entity was optimal; in response to determining that the action performed by the video game entity was suboptimal, generate a healed training example, the healed training example comprising: (i) the state of the instance of the video game environment, and (ii) healed scored action data indicative that the action performed by the video game entity was suboptimal; and updating the compressed machine-learning model based on the healed training example, wherein the updated compressed machine-learning model forms the trained machine-learning model for any subsequent model compression iterations.

In some implementations, the input data comprises positional information for the video game entity.

In some implementations, the generated prediction for each of one or more actions that the video game entity can perform in relation to the state of the instance of the video game environment comprises a score for the respective action that the video entity can perform. Performing, based on one of the generated predictions, the action by the video game entity may comprise selecting the action with the highest score, and performing the selected action. Generating the healed training example may comprise adjusting the score for the performed action to form the healed scored action data.

In some implementations, the non-transitory computer-readable medium of claim 15, stores further instructions, which when executed by the processor, cause the processor to iteratively collect a plurality of healed training examples from a plurality of instances of the video game environment. Updating the compressed machine-learning model may further comprise updating the compressed machine-learning model based on one or more of the collected plurality of healed training examples.

In some implementations, determining whether the action performed by the video game entity was optimal comprises determining whether the action performed by the video game entity was successful. The healed training example may be generated in response to determining that the action performed by the video game entity was unsuccessful.

In some implementations, deploying the updated compressed machine-learning model for replacing a current version of a machine-learning model or AI being used with the video game entity.

In accordance with a third aspect, this specification provides a computing system comprising a plurality of computing devices and a video game server apparatus. Each of the plurality of computing devices is configured to: execute an instance of a video game application; determine a state of an instance of a video game environment of the video game application; generate a prediction for each of one or more actions that a video game entity can perform in relation to the state of the instance of the video game environment, the generating comprising processing input data using a trained machine-learning model associated with the video game entity, wherein the input data comprises a representation of the state of the instance of the video game environment; perform, based on one of the generated predictions, an action by the video game entity; and determine whether the action performed by the video game entity was optimal. The video game server apparatus is configured to: receive a plurality of healed training examples associated with each of the plurality of computing devices, each healed training example associated with each computing device generated based on: determining that an action performed on said each computing device by the video game entity in relation to the corresponding machine-learning model associated with the video game entity was suboptimal; and generating said each healed training example comprising: (i) the state of the instance of the video game environment on said each computing device prior to the action being performed, and (ii) healed scored action data indicative that the action performed by the video game entity was suboptimal; and update the trained machine-learning model associated with the video game entity based on the plurality of healed training examples.

In accordance with a fourth aspect, this specification provides computer-implemented methods for use in a system comprising a plurality of computing devices and a video game server apparatus. A computer-implemented method, for each of the plurality of computing devices, comprising: executing an instance of a video game application; determining a state of an instance of a video game environment of the video game application; generating a prediction for each of one or more actions that a video game entity can perform in relation to the state of the instance of the video game environment, the generating comprising processing input data using a trained machine-learning model associated with the video game entity, wherein the input data comprises a representation of the state of the instance of the video game environment; performing, based on one of the generated predictions, an action by the video game entity; and determining whether the action performed by the video game entity was optimal. A computer-implemented method, for the video game server apparatus, comprising: receiving a plurality of healed training examples associated with each of the plurality of computing devices, each healed training example associated with each computing device generated based on: determining that an action performed on said each computing device by the video game entity in relation to the corresponding machine-learning model associated with the video game entity was suboptimal; and generating said each healed training example comprising: (i) the state of the instance of the video game environment on said each computing device prior to the action being performed, and (ii) healed scored action data indicative that the action performed by the video game entity was suboptimal; and updating the trained machine-learning model associated with the video game entity based on the plurality of healed training examples. As an option, deploying the updated machine-learning model associated with the video game entity to update the video game of each of the plurality of computing devices.

In some implementations, each of the plurality of computing devices is further configured to: in response to determining that the action performed by the video game entity was suboptimal, generate a healed training example, the healed training example comprising: (i) the state of the instance of the video game environment on said each computing device, and (ii) healed scored action data indicative that the action performed by the video game entity for said each computing device was suboptimal. Each of the plurality of computing devices may further be configured to transmit the healed training example to the video game server apparatus.

In some implementations, the video game server apparatus is further configured to: in response to receiving data representative of a determination that the action performed by the video game entity was suboptimal from each of the plurality of computing devices, generate a healed training example, the healed training example comprising: (i) the state of the instance of the video game environment of the video game application on said each computing device, and (ii) healed scored action data indicative that the action performed by the video game entity for said each computing device was suboptimal.

In some implementations, the video game application of each computing device comprises the trained machine-learning model, each trained machine-learning model having the same weight values, prior to being updated based on the plurality of healed training examples, as a trained machine-learning model that is stored as part of the video game server apparatus.

In some implementations, the computing system is further configured to deploying said updated trained machine-learning model associated with the video game entity as an update to the video game application on each of the plurality of computing devices.

In some implementations, the video game server apparatus is further configured to iteratively collect a plurality of healed training examples from a plurality of instances of the video game environment of the video game application for each of the computing devices. Updating the machine-learning model may further comprise updating the machine-learning model based on one or more of the collected plurality of healed training examples.

In some implementations, determining whether the action performed by the video game entity was optimal comprises determining whether the action performed by the video game entity was successful. The healed training example may be generated based on determining that the action performed by the video game entity was unsuccessful.

DESCRIPTION

General Definitions

Figure 1:
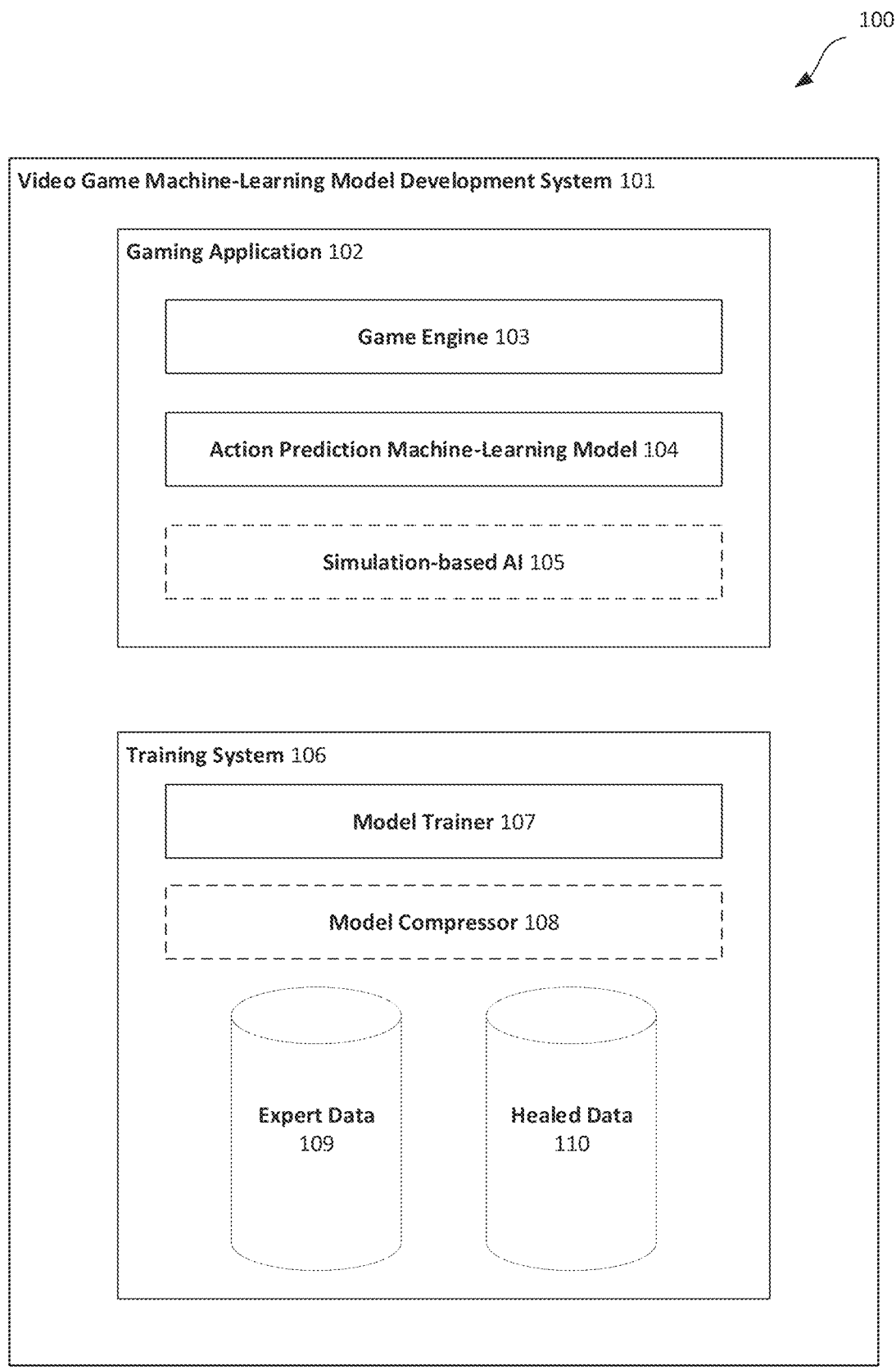
FIG. 1 is a schematic block diagram illustrating an example of a computer system configured to implement a video game machine-learning model development system.

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "client", as used in some embodiments described herein, is a software application with which a user interacts, and which can be executed on a computing system or device locally, remotely, or over a cloud service.

A "server", as used in some embodiments described here, is a software application configured to provide certain services to a client, e.g. content and/or functionality.

A "video game", as used in some embodiments described herein, is a virtual interactive environment in which players engage. Video game environments may be facilitated through a client-server framework in which a client may connect with the server to access at least some of the content and functionality of the video game.

A "video game entity", as used in some embodiments described herein, is a video game controllable entity or game asset capable of performing actions in a video game environment of a video game that may or may not be controlled by a player of the video game such as, without limitation, a player character, a player vehicle or other game entity, a non-player character, a non-player vehicle or other game entity and the like and/or any other aspect of a game asset/entity within the video game environment.

Overview

This specification describes systems and methods for providing an action prediction machine-learning model that generates predictions for each of one or more actions that a video game entity in a video game environment can perform. In particular, the systems and methods described herein generate healed data in the form of healed training examples for use in training/updating the action prediction machine-learning model. For example, the action prediction machine-learning model(s) may be trained using expert data describing actions performed by a video game entity, however this expert data may contain mistakes/errors with respect to an optimal (or successful) action that the video game entity could have performed instead of the action(s) represented in the expert data. Alternatively or additionally, in another example, when the action prediction machine-learning model(s) are trained using the expert data describing actions performed by the video game entity, the resulting action prediction machine-learning model(s) controlling the video game entity may, after training, still make sub-optimal (or unsuccessful) actions/decisions with respect to an optimal (or successful) action that the video game entity could have performed instead of the action(s) resulting from the action prediction machine-learning model(s). The described systems and methods provide healing of the expert data, generating healed data that corrects mistakes in the expert data, and/or generating healed data that corrects the sub-optimal (unsuccessful) actions/decisions made by one or more trained action prediction machine-learning model(s). The healing of expert data or generated healed data enables a more accurate and adaptable action prediction machine-learning model to be provided after training using the healed data. The expert data may be obtained in any suitable manner, e.g. from a simulated-based artificial intelligence (AI) controlling actions performed by a video game entity, from data of a human player controlling actions performed by a video game entity, from motion capture data of humans performing actions corresponding to those performed by a video game entity, and or from any other suitable source as the application demands.

For example, the video game may be a sports video game such as a football video game, and a video game entity may be a particular quarterback of the football video game. In this example, the actions that the quarterback may perform in a state of the video game environment include passes to several receivers on the quarterback's team. At a given moment, some of the receivers may be in a better position to receive a pass than others, e.g. some may be further away from defenders on the opponent team, closer to the end zone they are attacking, etc. Thus it can be useful to generate predictions for the likelihood of success of the passes (or plays) that the quarterback can perform, e.g., whether or not a receiver or player in the football team will be open or unobstructed enough to catch the pass. These predictions can be relevant regardless of whether or not the quarterback is controlled by a human player—for example, to pass the ball to a specific receiver (e.g., when the quarterback is not controlled by a human) or to suggest or recommend passing the ball to a specific football team player (e.g., when the quarter back controlled by a human). This may be applied to any football player position on the football team, one or more of which may be controlled by one or more humans and the like and one or more of which may be controlled by an AI or an action prediction machine-learning model. These predictions may be provided or displayed via the video game entity controlled by each human player of the football video game for highlighting, without limitation, which of the receivers are more "open" above the other receivers, which may be less "open". These concepts of predicting the likelihood of success of a play may be applied to other sports video games and the like. Although a football video game with football player is described, this is by way of example only and is not limiting, it is to be appreciated by the skilled person that the concepts described herein are applicable to any other video game with one or more video game entities and the like.

Existing methods of generating predictions for these passes may involve performing simulations of the different passes the quarterback may perform in the state of the video game environment (e.g. the positions of the various football players involved in the match, the speed of the football players, the position of the ball, etc.) and calculating which passes are likely to be successfully received by a receiver (e.g. without an opposition defender intercepting the pass). Such simulations may be used to provide an artificial intelligence (AI) for the quarterback that calculates the likelihood of success for different passes, and performs the pass with the highest calculated likelihood of success.

However, in such a scenario, passes performed by the quarterback AI may be unsuccessful for a variety of reasons. For example, various video game entities of the football video game (e.g. quarterbacks, receivers, defenders, etc.) may be updated frequently to reflect updated characteristics of the video game entities, such as position, skill level, injury status etc., and there may be multiple versions of video game entities. A simulation-based AI may be provided from performing simulations in a video game environment comprising a previous version of the video game entities, which may be an immediately previous version to an updated version of a video game entity, an initial version, or any version in between. The video game entities may be based on real-life football players, and the characteristics/attributes of the video game entities may be updated to reflect, without limitation, recent performances, health status, injury and/or skill level of the corresponding real-life football players. As an example, a defender covering a receiver may have updated characteristics (e.g. speed) compared to a previous version of the defender used to provide the quarterback AI. Thus the quarterback AI may perform the pass to the covered receiver due to the AI calculating the likelihood of success of the pass to be greater than it should be as a result of only having experience with the previous version of the defender. In addition, performing these simulations and calculations is computationally expensive and as a result, during runtime it may be possible to evaluate only a few pass options as the video game is being played before gameplay is affected.

Methods and systems described herein enable the simulation-based quarterback AI of the example above to be replaced with an action prediction machine-learning model that has been trained using expert data and/or with healed data, which corrects mistakes made by the simulation-based quarterback AI, in addition to mistakes due to the predictions for passes generated by the action prediction machine-learning model itself. The action prediction machine-learning model is initially trained using expert data, which in this example, is provided by the passes made by the simulation-based quarterback AI. When generating the expert data using the simulation-based quarterback AI, the simulation-based quarterback AI performs passes in accordance with its predictions in an instance of the video game environment. A game engine evaluates the outcomes of performing these passes (e.g. whether the passes were successful, whether there was a better pass option, etc.). Expert data is formed from training examples of game states at the time the predictions for passes were made by the simulation-based quarterback AI and the predictions themselves.

One or more of the passes made by the simulation-based quarterback AI may be determined by the game engine to be suboptimal (e.g. an unsuccessful pass, or a successful pass but made to a receiver in a worse position than another open receiver). Thus, healed training examples are generated for these suboptimal passes by healing/correcting the predictions made by the simulation-based quarterback AI to indicate that the pass was suboptimal. For example, if the simulation-based AI generated a high score for a suboptimal pass (e.g. indicating a high calculated likelihood of success for the pass) the generated score may be decreased to form a healed training example.

After training the action prediction machine-learning model with expert data and/or healed data obtained from healing the expert data and/or generated as a result of the action prediction machine-learning model making a suboptimal (or unsuccessful) action, then the above-process may be iteratively performed, for example, a similar healing process as described above may be performed using the action prediction machine-learning to generate predictions for passes (instead of using the simulation-based quarterback AI), in which healing data may again be generated depending on the actions output by the action prediction machine-learning model. In this way, the action prediction machine-learning model may be considered to be self-correcting as it can correct for mistakes made in its own predictions. Furthermore, this self-correction mechanism can enable the action prediction machine-learning model to be adaptable to changes in the video game environment. For example, in the case that a defender is updated to be faster in speed than previously, healed training examples can be generated that reflect the change in pass outcomes due to the update to the defender.

Furthermore, replacing the simulation-based quarterback AI with the action prediction machine-learning model may lead to a substantial reduction in computational resources required to generate predictions for passes. Thus, more pass options can be evaluated as the video game is being played, leading to more diverse and improved gameplay.

It should be noted that the above-described example of the video game being a football video game and the video game entity being a quarterback is an illustrative example, and that the methods and systems described herein can be applied to any video game involving generating predictions for actions performed by a video game entity. For example, the video game may be any type of video game in which one or more video game entities may be controlled by the video game such as, without limitation, for example a real-time strategy game; an action-adventure game; survival and/or horror game; a first person and/or third person shooter game; simulation, racing and/or sports game; multiplayer online battle arena (MOBA) game; music game; sandbox and/or simulation game; role-playing game (e.g. RPG, Action RPG, massively multiplayer online RPGs, tactical RPGs and the like, etc.); platformer game; and/or any other type of video game with video game entities controllable using one or more AI or action prediction machine-learning models and the like, etc. In addition, expert data may be obtained from any suitable source in addition to, or in lieu of, gameplay data obtained from a simulation-based AI controlling a video game entity. The expert data may be obtained from a simulated-based AI controlling actions performed by a video game entity, from data of a human player controlling actions performed by a video game entity, from motion capture data of humans performing actions corresponding to those performed by a video game entity, and/or from any other suitable source, and any combination thereof.

Methods and systems described herein also provide optimized action prediction machine-learning models in the form of compressed action prediction machine-learning models. A compressed action prediction machine-learning model is obtained by quantizing weights of a trained action prediction machine-learning model from a higher bit value (e.g. 64-bit) to a lower bit value (e.g. 16-bit). Methods and systems disclosed herein describe the generation of healed data using the compressed action prediction machine-learning model, and training the compressed action prediction machine-learning models using the healed data. Thus, action prediction machine-learning models can be provided that can be executed on a wide range of computing devices (including computing devices with constrained memory resources such as gaming consoles) and that also provide accurate predictions for actions that can be performed by a video game entity.

Methods and systems described herein also provide for action prediction machine-learning models that are trained from healed data generated using action data obtained from a plurality of computing devices. For example, action prediction machine-learning models may be provided as part of a video game application that is executed on each of the computing devices e.g. while a player is playing the video game. The above-described healing process can be performed to heal predictions made on each computing device by the action prediction machine-learning model. In this way, more healed data may be obtained for updating the action prediction machine-learning model, and a more accurate action prediction machine-learning model may be provided to each of the computing devices.

Additionally and/or alternatively, as another example, action prediction machine-learning models may be provided as part of a video game application that is deployed at scale on a plurality of computing devices e.g. while a player is playing the video game. The above-described healing process can be performed in which each of the plurality of computing devices may generate action data that may be received by a server for generating healing data that heals predictions made on each computing device by the corresponding action prediction machine-learning model. In this way, healed training data may be obtained at scale from the plurality of computing devices in which the server may use to centrally update the action prediction machine-learning model before providing as an update to each of the deployed video game applications, where a more accurate and/or up-to-date action prediction machine-learning model may be provided to update the video game on each of the computing devices.

Example Video Game Machine-Learning Model Development System

FIG. 1 is a schematic block diagram illustrating an example of a computer system 100 configured to implement a video game machine-learning model development system 101. The video game machine-learning model development system 101 is configured to generate healed data 110 and train action prediction machine-learning model(s) 104 using the healed data 110. For the sake of clarity, the video game machine-learning model development system 101 is illustrated as comprising a specific number of components. Any of the functionality described as being performed by a specific component of the system may instead be performed across a number of components, and/or functionality described as being performed by multiple components may be performed on a single component.

The video game machine-learning model development system 101 includes gaming application 102 configured to provide a video game. Gaming application 102 includes a game engine 103. The game engine 103 can be configured to execute aspects of the operation of the gaming application 102 according to game rules. Examples of game rules can include rules for scoring, possible inputs, actions/events, movement in response to inputs, and the like. The game engine 103 may receive inputs (provided by a user and/or by other components of the system 101) and determine in-game events, such as actions, jumps, runs, throws, attacks, and other events appropriate for the gaming application 102. During runtime operation, the game engine 103 can read user inputs, in-game data, and game state information to determine the appropriate in-game events.

Furthermore, the game engine 103 is configured to determine the state of a video game environment of the video game as it is being played. For example, in a football video game, the video game environment may be of a particular match being played between two teams. In this example, the state of the video game environment may include the positions of the various football players playing in the match, the position of the ball, a current score of the match, the time in the match (e.g. the amount of game time that has elapsed). The game engine 103 may determine the state of the video game environment of the video game continually (e.g. periodically, such as before the rendering of each video frame). In another example, in a shooter or action-based adventure video game, the video game environment may be of a particular battlefield or adventure region/area that is being navigated by one or more players and the like. In this example, the state of the video game environment may include the positions of the various video game entities participating in the shooter battlefield or adventure region/area while the player is passing through, the status or health of the player and/or video game entities, a current score for the shooter player or of the player completing one or more stages of the adventure area, the time in the shooter game or adventure game (e.g. the amount of game time that has elapsed). The game engine 103 may determine the state of the video game environment of the video game continually (e.g. periodically, such as before the rendering of each video frame, multiple frames, etc.).

The gaming application 102 includes an action prediction machine-learning model 104 that is being trained by training system 106. The action prediction machine-learning model 104 is a machine-learning model configured to generate a prediction for each of one or more actions that a video game entity of the video game environment can perform. For example, where the video game environment is a football match being played, the action prediction machine-learning model 104 may be configured to generate predictions indicating a score for each of one or more passes that a quarterback can make. In another example, where the video game environment is a shooter being played, the action prediction machine-learning model 104 may be configured to generate predictions indicating a score for each of one or more targeting solutions that an enemy video game entity can make against the player. An action prediction machine-learning model 104 may be configured to generate predictions for each of a plurality of video game entities. Additionally or alternatively, a separate action prediction machine-learning model 104 may be provided for each of one or more video game entities. A video game entity may be any object in the video game environment that is capable of performing actions in the video game environment such as a football player, a fighter, a race car, a spaceship, etc.

The action prediction machine-learning model 104 is any suitable machine-learning model for generating predictions for actions that a video game entity can perform. For example, the action prediction machine-learning model 104 may comprise a statistical model or a neural network. For example, the neural network comprising a plurality of neural network layers, each neural network layer associated with a set of parameters/weights. In another example, the action prediction machine-learning model 104 may be a convolutional neural network comprising a plurality of convolutional layers. Additionally or alternatively, the action prediction machine-learning model 104 may comprise, without limitation, any other statistical model, a linear regression model, a logistic regression model, a decision tree, or any other suitable machine-learning model configurable for performing imitation learning and/or configured for use in generating predictions for actions or predicting actions that an entity or video game entity may perform within a video game environment.

After training with a number of training examples, a trained action prediction machine-learning model 104 is configured to receive input data comprising a representation of a state of the video game environment. The game engine 103 determines when a prediction is required by the trained action prediction machine-learning model 104, determines the state of the video game environment, and provides data relating to the state of video game environment to the trained action prediction machine-learning model 104 to form the input data.

The input data for the trained action prediction machine-learning model 104 may be provided in the form of a vector of values, with each element of the vector representing a different characteristic of the state of the video game environment. For example, the input data may comprise a vector representation of the position of each of the various video game entities of the video game environment. The positions may be indicated by absolute position (e.g. co-ordinates of the entities with respect to an origin of a co-ordinate system) and/or by relative position (e.g. co-ordinates with respect to a particular entity of the video game environment). Additionally, the input data may comprise further data used for generating predictions for actions. For example, in the case that an action prediction machine-learning model 104 is used to generate predictions for actions for a plurality of video game entities, a selection of a particular video game entity for which action predictions are desired may be provided in the input data. The input data may comprise indicators of the various video game entities of the video game environment (e.g. the particular football players involved in a football match) and/or their characteristics/attributes (e.g. speed, an indication as to their skill, etc.). The input data may comprise data relating to one or more objects of the video game environment, e.g. the position of a ball in a football video game, or the positions of enemy fighters in a shooter game, or the positions of race participants/entities in a racing game etc.

The trained action prediction machine-learning model 104 processes the input data and generates an output. The output is a prediction for each of one or more actions that a video game entity can perform. The prediction may be provided in the form of a score for each of the actions that the video game entity can perform. The score may indicate how likely the action is to be successful and/or the utility of performing the action. Additionally or alternatively, the output may indicate a particular action of a set of actions that the trained action prediction machine-learning model 104 has determined as being most suitable for the state of the video game environment.

The game engine 103 causes the video game entity to perform an action in accordance with the prediction(s) generated by the trained action prediction machine-learning model 104. For example, in the case that the trained action prediction machine-learning model 104 generates predictions in the form of scores for actions, a selection of the highest-scoring action may be provided to the game engine 103. Additionally or alternatively, the scored actions may be sampled in accordance with their scores and a sampled action may be provided to the game engine 103. In this example, higher scoring actions may have a higher probability of being selected as the sampled action. As another example, in the case that the trained action prediction machine-learning model 104 provides an output in the form of an indication of a particular action, the particular action is provided to the game engine 103. The game engine 103 causes the video game entity to perform an action and determines the state of the video game environment subsequent to the action being performed. The predictions made by the trained action prediction machine-learning model 104 and states of the video game environment prior and subsequent to the action being performed are used to generate healed data 110, as will be described in greater detail below.

The action prediction machine-learning model 104 is trained using training system 106. The training system comprises model trainer 107, expert data 109, and healed data 110.

Expert data 109 comprises a plurality of training examples, which may be obtained from any suitable source. The expert data may be obtained from a simulated-based AI 105 controlling actions performed by a video game entity, from data of a human player controlling actions performed by a video game entity, from motion capture data of humans performing actions corresponding to those performed by a video game entity, or from any other suitable source, and any combination thereof.

Each training example of the expert data 109 comprises a representation of a video game environment prior to an action being performed by a video game entity of the video game environment, and a score for the performed action. The representation of the state of the video game environment may be provided in the form of a vector. The score for the performed action may be provided in the form of a number for a particular action or a vector of numbers for each of a plurality of actions.

For example, the representation of the state of the video game environment may comprise a vector representation of the position of each of the various video game entities of the video game environment. The positions may be indicated by absolute position (e.g. co-ordinates of the entities with respect to an origin of a co-ordinate system) and/or by relative position (e.g. co-ordinates with respect to a particular entity of the video game environment). Additionally, the representation of the state of the video game environment may comprise further data used for generating predictions for actions. For example, an indication of a particular video game entity that performed the action predictions may be provided in the representation of the state of the video game environment. The representation of the state of the video game environment may comprise indicators of the various video game entities of the video game environment (e.g. the particular football players involved in a football match) and/or their characteristics/attributes (e.g. speed, an indication as to their skill, etc.). The representation of the state of the video game environment may comprise data relating to one or more objects of the video game environment, e.g. the position of a ball in a football video game.

In some implementations, the score for the performed action may be the same for all training examples of the expert data 109 and the score may be used to indicate which action was taken. For example, each training example may comprise a score for each of a plurality of actions, and the score for performed actions may have a value of 1, while the score for non-performed actions may have a value of 0. In other implementations, the scores of training examples may be obtained from scores for actions generated by a simulation-based AI 105, and performed actions corresponding to different training examples may have different scores.

Figure 2:
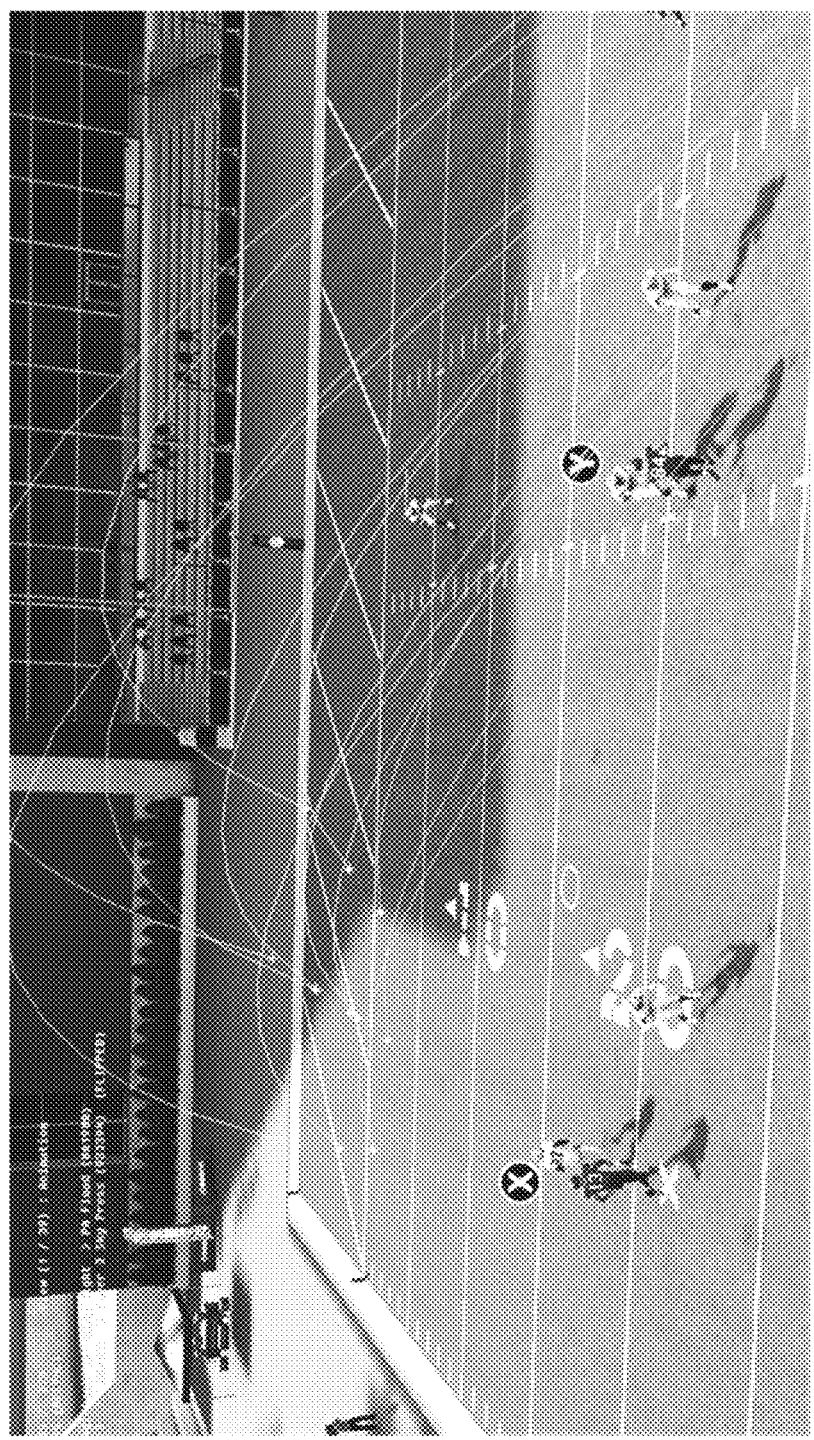
FIG. 2 shows an example of generating expert data using a simulated-based artificial intelligence (AI) controlling an entity of the video game.

In implementations where the expert data 109 is obtained from a simulation-based AI 105 controlling the video game entity, the simulation-based AI 105 may be provided as part of the gaming application 102. The simulation-based AI 105 receives a representation of the state of the video game environment, provided by the game engine 103, performs simulations according to the different actions that the video game entity can perform in the state of the video game environment, and calculates a score for each of the different actions. For example, in a football video game, the simulation-based AI 105 may control a quarterback, and may perform simulations of the different passes that the quarterback can perform, as shown in FIG. 2. In another example, in a shooter video game, the simulation-based AI 105 may control an enemy agent, and may perform simulations of the different targeting solutions on the player that the enemy agent can perform to hit the player.

An action is selected based on the scores generated by the simulation-based AI ion. For example, a highest-scoring action may be selected as the action for the video game entity to perform. Game engine 103 receives a selected action and causes the video game entity to perform the selected action. Subsequently, the game engine 103 determines the state of the video game environment after the video game entity performs the action, and determines whether the performed action was the optimal action for the video game entity to perform in the prior state of the video game environment (i.e. prior to the action being performed). This may be achieved in any suitable manner, such as by the game engine 103 performing one or more non-selected actions and determining the state of the video game environment subsequent to these one or more non-selected actions being performed by the video game entity. In some implementations, a determination that the selected action was suboptimal may be made by the video game engine 103. For example, the video game engine 103 may be configured to determine whether the selected action was unsuccessful (e.g. a pass made by a quarterback was intercepted).

Actions determined to be optimal (or successful) and their corresponding scores are stored as part of the expert data 109, along with the state of the video game environment prior to the action being performed (e.g. the state of the video game environment used to generate the action predictions by the simulation-based AI ion).

Actions determined to be suboptimal (or unsuccessful) and their corresponding scores are used to form healed data no which comprises a plurality of healed training examples. Each healed training example also comprises a representation of the state of the video game environment prior to the action of the training example being performed (e.g. the state of the video game environment used to generate the action predictions by the simulation-based AI ion). The score generated by the simulation-based AI is adjusted to indicate that the selected action was suboptimal (or unsuccessful). For example, the score may be decreased by a certain amount/percentage. A healed training example comprises an adjusted score and the state of the video game environment prior to the corresponding action being performed.

Although shown as separate components of the training system 106, it will be appreciated that the expert data 109 and healed data 110 may be combined to form a single dataset. For example, healed training examples may be appended to the training examples of the expert data 109 and/or may replace examples of the expert data 109 that required healing/adjustment of scores.

To train the action prediction machine-learning model 104, the model trainer 107 receives the expert data 109, and optionally, healed data 110, and trains the action prediction machine-learning model 104 to optimize an objective function. For example, the model trainer 107 may train the action prediction machine-learning model 104 to optimize a cross-entropy loss function, a least-squares loss function, or any other suitable loss function and combinations thereof. In general, training the action prediction machine-learning model 104 to optimize an objective function minimizes differences (or errors) between outputs generated by the action prediction machine-learning model 104 from processing training examples of the expert data 109 (and, optionally, healed data 110) and the corresponding scores of the training examples.

In more detail, the action prediction machine-learning model 104 receives one or more training examples from the expert data 109 (and, optionally, the healed data 110). The action prediction machine-learning model 104 processes the one or more training examples in accordance with a current set of parameters (also referred to herein as weights), and generates a predicted output for each of the training examples. The model trainer 107 receives the predicted outputs and performs a comparison between the predicted output of each training example and the score of the performed action of the corresponding training example. The comparison is performed as part of optimizing the objective function that the action prediction machine-learning model 104 is being trained to optimize. Parameters/weights of the action prediction machine-learning model 104 are updated in dependence on the comparison. The parameters of the action prediction machine-learning model 104 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

As will be described in greater detail in relation to FIGS. 3 and 4, additionally or alternatively, healed data no may be generated using action predictions generated by a trained (or partially trained) action prediction machine-learning model 104. Healed training examples generated in this way can also be used to update the action prediction machine-learning model 104. For example, the action prediction machine-learning model 104 may be (partially) trained using a portion of the expert data 109 (and optionally, one or more healed training examples of healed data 110). Action predictions generated by the (partially) trained action prediction machine-learning model 104 may be healed in the case of suboptimal actions being selected for performance by the video game entity, similar to as described above for action predictions generated by simulation-based AI 105, and used to form healed data 110.

In some implementations, the training system 106 may further comprise a model compressor 108 configured to generate a compressed action prediction machine-learning model. As will be described in greater detail in relation to FIGS. 5 and 6, the model compressor 108 receives a trained action prediction machine-learning model 104 and compresses the model. The compression is achieved by quantizing the weights of the trained action prediction machine-learning model 104 from a higher-bit value (e.g. $_{64}$-bits) to a lower bit-value (e.g. 16-bits). The compression may be performed in several stages, e.g. by quantizing the weights from 64-bits to 32-bits, then from 32-bits to 16-bits, etc. Healed data 110 may also be generated using compressed action prediction machine-learning models and used for updating or retraining those compressed action prediction machine-learning models.

Although the video game machine-learning model development system 101 is shown as providing a gaming application 102, it will be appreciated that the system 101 may omit certain components of the gaming application 102. For example, the system 101 may, in some implementations, only provide game engine 103 of the gaming application 102.

Trained action prediction machine-learning model(s) 104 are stored in the video game machine-learning model development system 101, and may be versioned to indicate that it has been trained using data corresponding to a particular version of the video game entity and/or video game environment. Thus the gaming application 102 may be able to provide a most recent version of action prediction machine-learning model(s) 104, an initial version of action prediction machine-learning model(s) 104, or any version in between, in case it is desired to provide an action prediction machine-learning model(s) 104 corresponding to a previous version of the video game entity and/or video game environment (e.g. rolling back an action prediction machine-learning model 104 to a previous version).

Example Expert Data Generation Method

FIG. 2 shows an example 200 of generating expert data using a simulated-based artificial intelligence (AI) controlling an entity of the video game. In this example, the video game is a football video game, and the video game entity is a quarterback. The simulation-based AI performs a simulation for each of a plurality of passes that the quarterback can perform, shown by the trajectories in FIG. 2. For each of the pass trajectories, the simulation-based AI calculates a score indicating how likely the pass is to be successfully thrown to the receivers (shown with jerseys numbered 13 and 84 in FIG. 2). This involves calculating the positions the receivers can reach, and the positions the defenders (shown in white jerseys in FIG. 2) can reach, and scoring the passes with higher scores for passes that are more difficult for defenders to reach. A highest-scoring pass option is selected as the pass for the quarterback to throw. The game engine causes the quarterback to perform the pass, and determines the state of the video game environment subsequent to the pass being made. A representation of the state of the video game environment when performing the simulations by the simulation-based AI is stored, along with the score for the selected pass, to form a training example of the expert data.

Example Healed Data Generation Method

Figure 3:
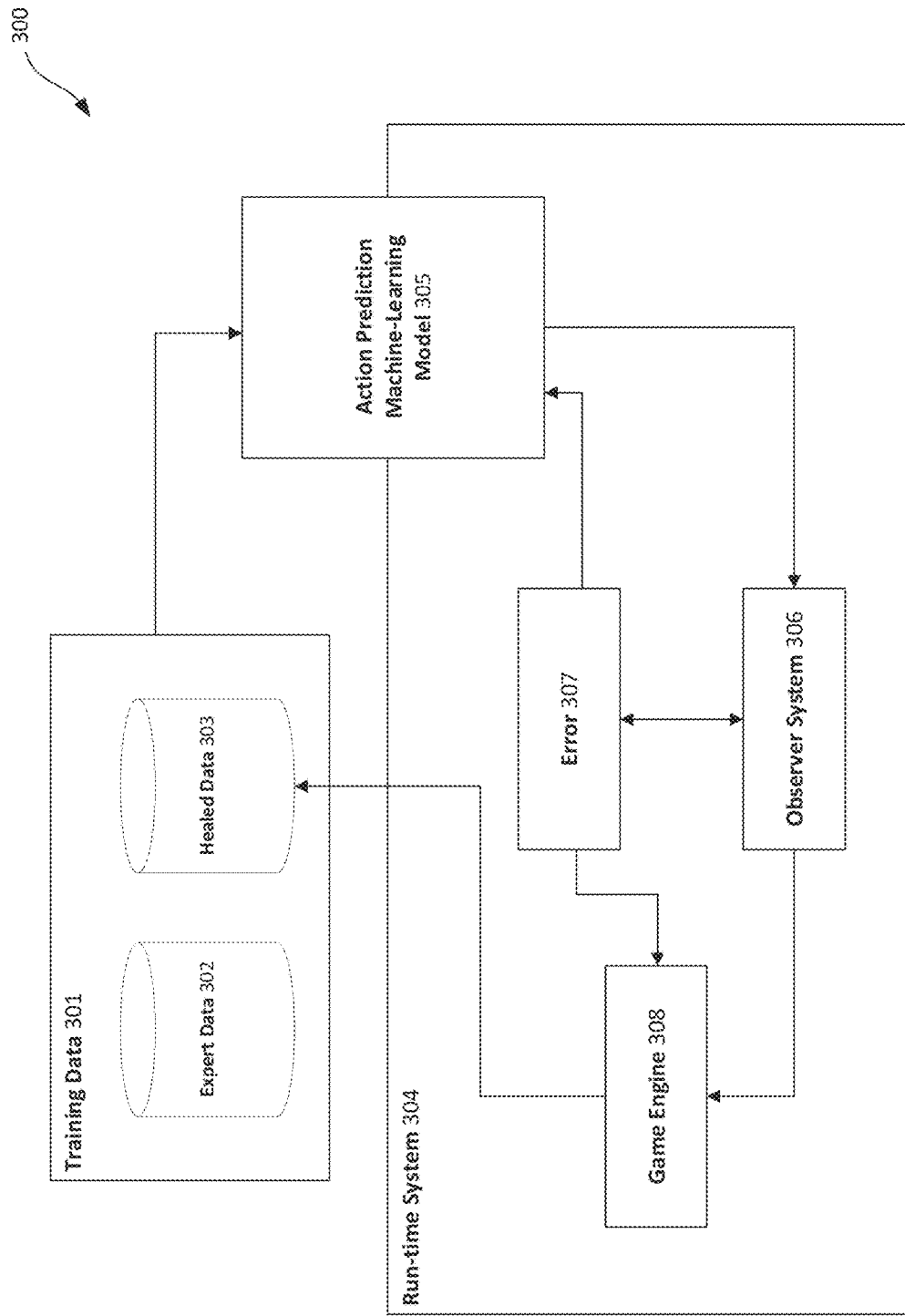
FIG. 3 illustrates an example method for generating healed data and training an action prediction machine-learning model using the healed data.

FIG. 3 illustrates an example method 300 for generating healed data 303 and training an action prediction machine-learning model 305 using the healed data 303. The action prediction machine-learning model 305 is initially trained using training data 301 comprising expert data 302 (or a portion thereof), as described in relation to FIG. 1. While the video game is being played or run, the action prediction machine-learning model 305 interacts with run-time system 304 in order to generate healed data 303.

After training using expert data 302, the action prediction machine-learning model 305 is used to generate predictions for one or more actions that a video game entity can perform in various states of the video game environment. The action prediction machine-learning model 305 receives input data comprising a representation of a state of the video game environment, which state is determined by game engine 308.

The action prediction machine-learning model 305 processes the input data and generates a prediction for each of one or more actions that the video game entity can perform in relation to the state of the video game environment. For example, the prediction may comprise a score for each of the one or more actions. One of the actions is selected (e.g. based on the predicted scores) for performance by the video game entity. For example, a highest scoring action may be selected.

The selection action is received by the observer system 306. The observer system 306 is configured to monitor the outcome of game engine 308 causing the video game entity to perform the selected action. In particular, the observer system 306 interacts with the game engine 308 to determine if any error 307 (or mistake) was made as a result of the video game entity performing the selected action. For example, the observer system 306 may interact with the video game entity to determine if the selected action was optimal (or successful).

This may be achieved in any suitable manner, such as by the game engine 308 performing one or more non-selected actions and determining the state of the video game environment subsequent to these one or more non-selected actions being performed by the video game entity. In some implementations, a determination that the selected action was suboptimal may be made by the video game engine 308. For example, the video game engine 308 may determine whether the selected action was unsuccessful (e.g. a pass made by a quarterback was intercepted).

If the observer system 306 determines an error 307 has been made (e.g. a suboptimal/unsuccessful action being performed), the observer system 306 triggers the generation of a healed training example to form part of the healed data 303. In particular, the observer system 306 generates a healed training example by adjusting the prediction generated by the action prediction machine-learning model 305 for the selected action. The prediction is adjusted to indicate that the selected action was suboptimal (or unsuccessful). For example, if the action prediction machine-learning model 305 generates a score for the selected action, the score of the selected action may be decreased to indicate that selected action was suboptimal/unsuccessful. The healed training example comprises the representation of the state of the video game environment used to form the input data to the action prediction machine-learning model 305, and the adjusted prediction indicating that the selected action was suboptimal/unsuccessful.

If the observer system 306 determines that an error has not been made, the observer system 306 may trigger the generation of a training example to form the expert data 302. The training example comprises the representation of the state of the video game environment used to form the input data to the action prediction machine-learning model 305, and the prediction generated by the action prediction machine-learning model 305 for the selected action.

Although shown as separate components, it will be appreciated that the expert data 302 and healed data 303 may be combined to form a single dataset. For example, healed training examples may be appended to the training examples of the expert data 302 and/or may replace examples of the expert data 302 that required healing/adjustment of scores.

Example Training Method Using Generated Healed Training Examples

Figure 4:
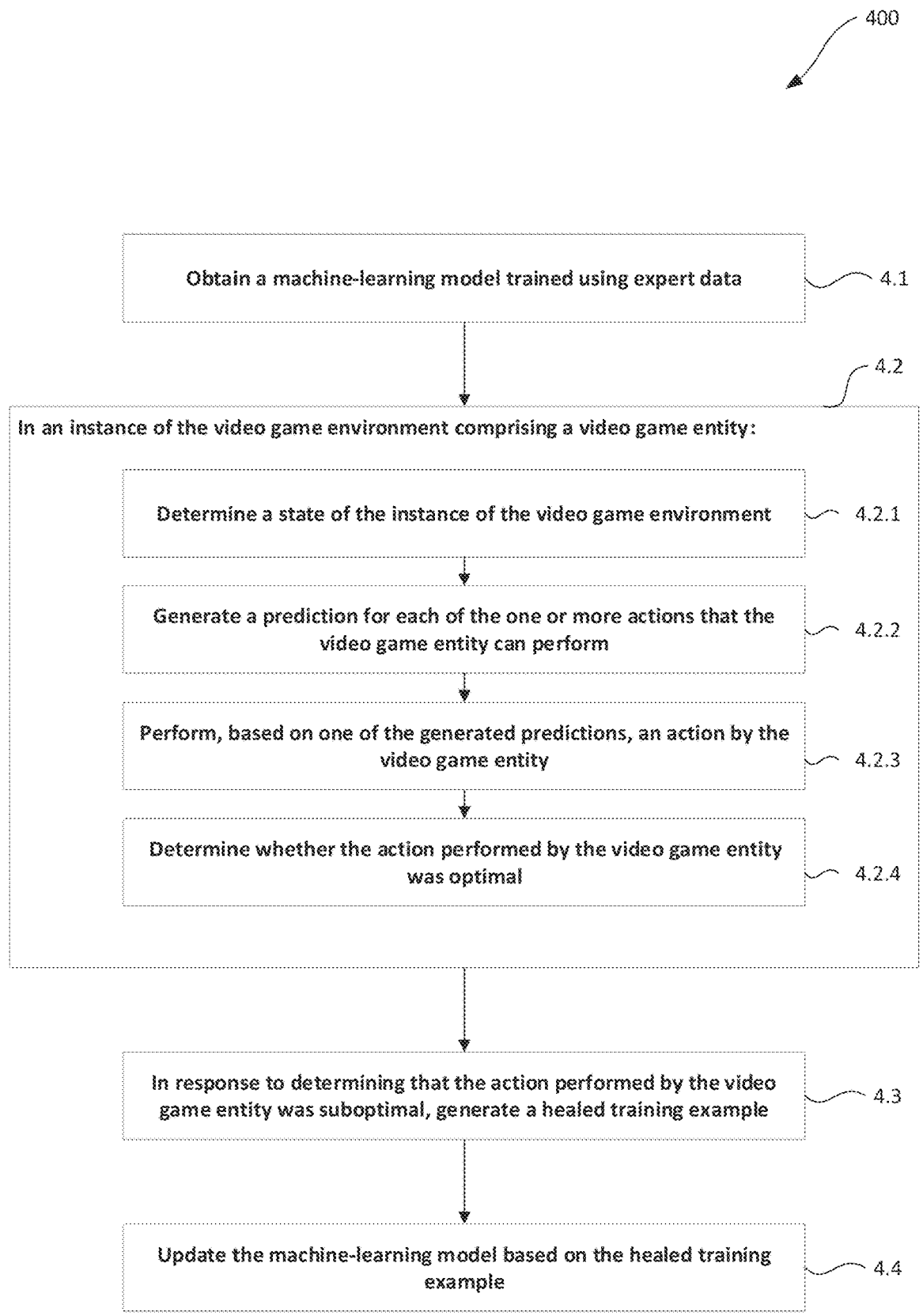
FIG. 4 is a flow diagram illustrating an example method of training a machine-learning model using generated healed training examples.

FIG. 4 is a flow diagram illustrating an example method 400 of training a machine-learning model using generated healed training examples.

In step 4.1, a machine-learning model that is being trained using expert data is obtained. The expert data comprises a plurality of training examples. Each training example comprises: (i) game state data representing a state of a video game environment, and (ii) scored action data representing an action and a score for that action if performed by a video game entity of the video game environment subsequent to the state of the video game environment.

The expert data may be obtained in any suitable manner, e.g. from a simulation-based artificial intelligence controlling the video game entity in the video game environment, from data of a human player controlling actions performed by a video game entity in the video game environment, from motion capture data of humans performing actions corresponding to those performed by a video game entity in the video game environment, or from any other suitable source and any combination thereof.

The machine-learning model may comprise a neural network. For example, the neural network may be a convolutional neural network. The machine-learning model may be trained with the expert data using imitation learning.

Step 4.2 comprises steps 4.2.1 to 4.2.4 which are performed in an instance of the video game environment comprising the video game entity.

In step 4.2.1, a state of the instance of the video game environment is determined.

In step 4.2.2, a prediction for each of the one or more actions that the video game entity can perform in relation to the state of the instance of the video game environment is generated. This comprises processing input data using the trained machine-learning model, wherein the input data comprises a representation of the state of the instance of the video game environment.

The input data may comprise positional information for the video game entity. The input data may further comprise positional information for each of one or more additional video game entities. The generated prediction for each of one or more actions that the video game entity can perform in relation to the state of the instance of the video game environment may comprise a score for the respective action that the video entity can perform.

In step 4.2.3, an action is performed by the video game entity based on one of the generated predictions.

Performing, based on one of the generated predictions, the action by the video game entity may comprise selecting an action with the highest score, and performing the selected action.

In step 4.2.4, a determination is made as to whether the action performed by the video game entity was optimal.

In step 4.3, a healed training example is generated in response to determining that the action performed by the video game entity was suboptimal.

In step 4.4, the machine-learning model is updated based on the healed training example. The healed training example comprises: (i) the state of the instance of the video game environment, and (ii) healed scored action data indicative that the action performed by the video game entity was suboptimal.

Generating the healed training example may comprise adjusting the score for the performed action to form the healed scored action data.

Updating the trained machine-learning model may further comprise updating the trained machine-learning model based on a combination of expert data and one or more of collected plurality of healed training examples.

Determining whether the action performed by the video game entity was optimal may comprise determining whether the action performed by the video game entity was successful; and the healed training example may be generated in response to determining that the action performed by the video game entity was unsuccessful.

The method 400 may further comprise iteratively collecting a plurality of healed training examples from a plurality of instances of the video game environment. Updating the machine-learning model may further comprise updating the machine-learning model based on one or more of the collected plurality of healed training examples. For example, steps 4.2 and 4.3 may be iteratively performed or repeated for each subsequent instance of the video game environment, and thus a plurality of healed training examples may be iteratively collected for use in updating in step 4.4 the machine-learning model. Subsequently steps 4.2 and 4.3 may be iteratively performed on the updated machine-learning model to collect further healed training examples, where in subsequent step 4.4 the machine-learning model is further updated. This iterative cycle may be performed for each update of the machine-learning model until the machine-learning model is sufficiently trained (e.g. no further healed training examples are generated, or the machine-learning model achieves a minimum error threshold and the like).

The method 400 may further comprise compressing the updated machine-learning model by quantizing weights of the updated machine-learning model from a higher-bit value to a lower-bit value.

The method 400 may further comprise compressing the trained machine-learning model by quantizing weights of the trained machine-learning model from a higher-bit value to a lower-bit value, wherein the compressed trained machine-learning model is used for generating the prediction for each of the one or more actions that the video game entity can perform in relation to the state of the instance of the video game environment. The method 400 may further comprise iteratively collecting a plurality of healed training examples from a plurality of instances of the video game environment using the compressed trained machine learning model for generating the predictions in relation to the actions performed by the video game entity. The method 400 may further comprise updating the compressed trained machine-learning model based on one or more of the collected plurality of healed training examples. Again, this method 400 may be iterated after each update to the compressed trained machine learning model, where the updated compressed trained machine learning model is used for generating the predictions in subsequent iterations or collections of healed training examples and updates and the like. The method 400 may further comprise deploying the updated machine learning model for replacing a current version of a machine learning model or AI being used with the video game entity.

Figure 5:
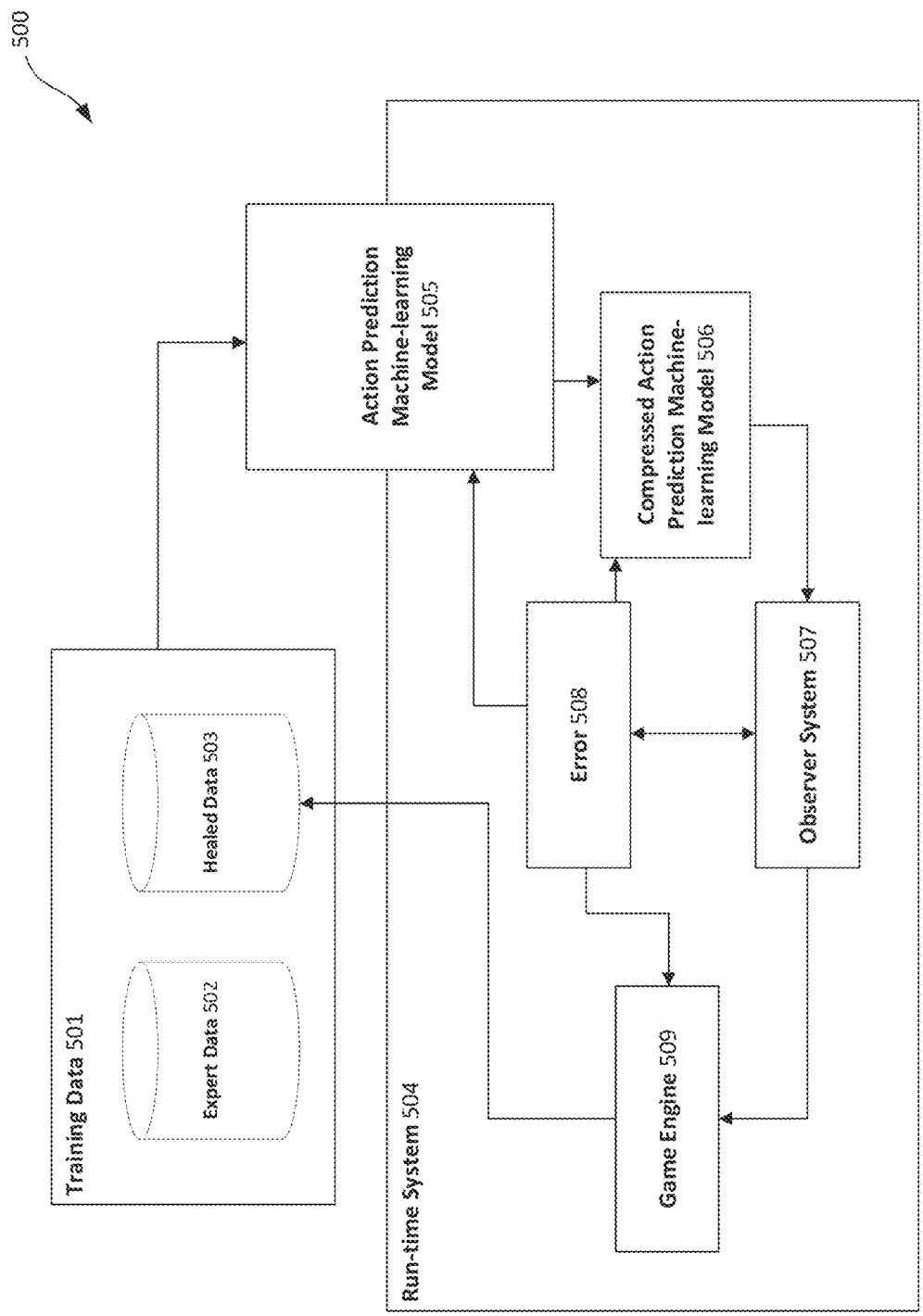
FIG. 5 illustrates an example method for generating healed data and training a compressed action prediction machine-learning model using the healed data.

Example Healed Data Generation Method for Compressed Machine-Learning Models FIG. 5 illustrates an example method 500 for generating healed data 503 and training a compressed action prediction machine-learning model 506 using the healed data. The compressed action prediction machine-learning model 506 is obtained from compressing a trained action prediction machine-learning model 505. The action prediction machine-learning model 505 is initially trained using training data 501 comprising expert data 502 (or a portion thereof), as described in relation to FIG. 1. While the video game is being played or run, the action prediction machine-learning model 505 and the compressed action prediction machine-learning model 506 interacts with a run-time system 504 in order to generate healed data 503.

After training using expert data 502, the action prediction machine-learning model 505 is compressed to generate a compressed action prediction machine-learning model 506. The compression involves quantizing weights of the action prediction machine-learning model 505 from a higher-bit value (e.g. 64-bit) to a lower-bit value (e.g. 32-bit). The quantizing involves approximating the number represented by the higher-bit value with the lower-bit representation. This quantization is performed for each of the weights of the action prediction machine-learning model 505. By using a lower-bit representation of the weights of the action prediction machine-learning model 505, the compressed action prediction machine-learning model 506 may more efficiently process input data, e.g. due to lower memory requirements required by the compressed action prediction machine-learning model 506.

The compressed action prediction machine-learning model 506 is used to generate predictions for one or more actions that a video game entity can perform in various states of the video game environment. The compressed action prediction machine-learning model 506 receives input data comprising a representation of a state of the video game environment, which state is determined by game engine 509.

The compressed action prediction machine-learning model 506 processes the input data and generates a prediction for each of one or more actions that the video game entity can perform in relation to the state of the video game environment. For example, the prediction may comprise a score for each of the one or more actions. One of the actions is selected (e.g. based on the predicted scores) for performance by the video game entity. For example, a highest scoring action may be selected.

The selection action is received by the observer system 507. The observer system 507 is configured to monitor the outcome of game engine 509 causing the video game entity to perform the selected action. In particular, the observer system 507 interacts with the game engine 509 to determine if any error 508 (or mistake) was made as a result of the video game entity performing the selected action. For example, the observer system 507 may interact with the video game entity to determine if the selected action was optimal (or successful).

This may be achieved in any suitable manner, such as by the game engine 509 performing one or more non-selected actions and determining the state of the video game environment subsequent to these one or more non-selected actions being performed by the video game entity. In some implementations, a determination that the selected action was suboptimal may be made by the video game engine 509. For example, the video game engine 509 may determine whether the selected action was unsuccessful (e.g. a pass made by a quarterback was intercepted).

If the observer system 507 determines an error 508 has been made (e.g. a suboptimal/unsuccessful action being performed), the observer system 507 triggers the generation of a healed training example to form part of the healed data 503. In particular, the observer system 507 generates a healed training example by adjusting the prediction generated by the compressed action prediction machine-learning model 506 for the selected action. The prediction is adjusted to indicate that the selected action was suboptimal (or unsuccessful). For example, if the compressed action prediction machine-learning model 506 generates a score for the selected action, the score of the selected action may be decreased to indicate that selected action was suboptimal/unsuccessful. The healed training example comprises the representation of the state of the video game environment used to form the input data to the compressed action prediction machine-learning model 506, and the adjusted prediction indicating that the selected action was suboptimal/unsuccessful.

If the observer system 507 determines that an error has not been made, the observer system 507 may trigger the generation of a training example to form the expert data 502.

The training example comprises the representation of the state of the video game environment used to form the input data to the compressed action prediction machine-learning model 506, and the prediction generated by the compressed action prediction machine-learning model 506 for the selected action.

Although shown as separate components, it will be appreciated that the expert data 502 and healed data 503 may be combined to form a single dataset. For example, healed training examples may be appended to the training examples of the expert data 502 and/or may replace examples of the expert data 502 that required healing/adjustment of scores.

The example method 500 illustrated in FIG. 5 can be repeated for a number of compression iterations. For example, a trained action prediction machine-learning model 505 may be compressed at each iteration of a plurality of compression iterations. As an illustrative example, if the trained action prediction machine-learning model 505 comprises weights represented by 64-bit values, a first compression iteration may be performed to compress the weights to have a 32-bit representation. This compressed action prediction machine-learning model 506 may be trained using the expert data 502 and healed data 503, which may be subsequently compressed in a further compression iteration to produce a further compressed action prediction machine-learning model 506 comprising weights having a 16-bit representation. The method 500 may further comprise deploying the trained compressed machine learning model for replacing a current version of a machine learning model or AI being used with the video game entity.

Figure 6:
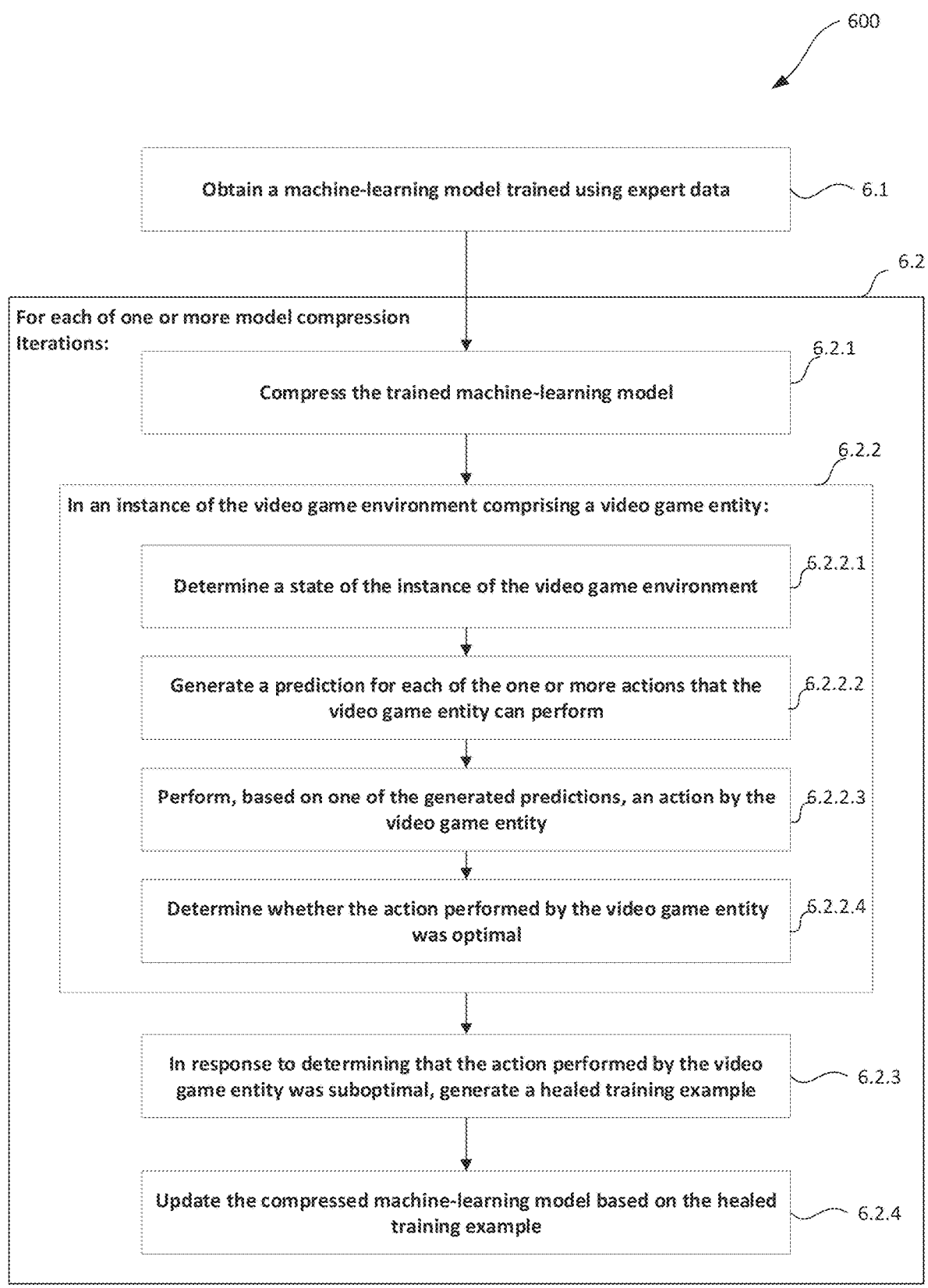
FIG. 6 is a flow diagram illustrating an example method of training a compressed machine-learning model using generated healed training examples.

Example Training Method for Compressed Machine-Learning Models Using Generated Healed Training Examples FIG. 6 is a flow diagram illustrating an example method 600 of training a compressed machine-learning model using generated healed training examples.

In step 6.1, a machine-learning model that has been trained using expert data is obtained. The expert data comprises a plurality of training examples. Each training example comprises: (i) game state data representing a state of a video game environment, and (ii) scored action data representing an action and a score for that action if performed by a video game entity of the video game environment subsequent to the state of the video game environment.

The expert data may be obtained in any suitable manner, e.g. from a simulation-based artificial intelligence controlling the video game entity in the video game environment, from data of a human player controlling actions performed by a video game entity in the video game environment, from motion capture data of humans performing actions corresponding to those performed by a video game entity in the video game environment, or from any other suitable source and any combination thereof.

The machine-learning model may comprise a neural network. For example, the neural network may be a convolutional neural network. The machine-learning model may be trained on the expert data using imitation learning.

Step 6.2 comprises steps 6.2.1 to 6.2.4 which are performed for each of one or more model compression iterations.

In step 6.2.1, the trained machine-learning model is compressed. This comprises comprising quantizing the weights of the trained machine-learning model from a higher-bit value to a lower-bit value.

Step 6.2.2 comprises steps 6.2.2.1 to 6.2.2.4 which are performed in an instance of the video game environment comprising the video game entity.

In step 6.2.2.1, a state of the instance of the video game environment is determined.

In step 6.2.2.2, a prediction for each of the one or more actions that the video game entity can perform in relation to the state of the instance of the video game environment is generated. This comprises processing input data using the compressed machine-learning model, wherein the input data comprises a representation of the state of the instance of the video game environment.

The input data may comprise positional information for the video game entity. The input data may further comprise positional information for each of one or more additional video game entities. The generated prediction for each of one or more actions that the video game entity can perform in relation to the state of the instance of the video game environment may comprise a score for the respective action that the video entity can perform.

In step 6.2.2.3, an action is performed by the video game entity based on one of the generated predictions.

Performing, based on one of the generated predictions, the action by the video game entity may comprise selecting an action with the highest score, and performing the selected action.

In step 6.2.2.4, a determination is made as to whether the action performed by the video game entity was optimal.

In step 6.2.3, a healed training example is generated in response to determining that the action performed by the video game entity was suboptimal.

In step 6.2.4, the compressed machine-learning model is updated based on the healed training example. The healed training example comprises: (i) the state of the instance of the video game environment, and (ii) healed scored action data indicative that the action performed by the video game entity was suboptimal.

Generating the healed training example may comprise adjusting the score for the performed action to form the healed scored action data.

Updating the compressed machine-learning model may further comprise updating the compressed machine-learning model based on a combination of expert data and one or more of collected plurality of healed training examples.

Determining whether the action performed by the video game entity was optimal may comprise determining whether the action performed by the video game entity was successful; and the healed training example may be generated in response to determining that the action performed by the video game entity was unsuccessful.

The method 600 may further comprise in outer iteration loop for each model compression iteration and, for each model compression iteration, an inner iteration loop may be performed for one or more iterations for iteratively collecting a plurality of healed training examples from a plurality of instances of the video game environment. Updating the compressed machine-learning model may further comprise updating the compressed machine-learning model based on one or more of the collected plurality of healed training examples. For example, in a particular model compression iteration, steps 6.2.2 and 6.2.3 of the inner iteration loop may be iteratively performed or repeated for each subsequent instance of the video game environment, and thus a plurality of healed training examples may be iteratively collected for use in updating in step 6.2.4 the compressed machine-learning model. In subsequent iterations of the inner loop, steps 6.2.2 and 6.2.3 may be iteratively performed using the updated compressed machine-learning model to collect further healed training examples, where in step 6.2.4 the compressed machine-learning model is further updated. This inner loop iterative cycle may be performed for each update of the compressed machine-learning model until the compressed machine-learning model is sufficiently trained (e.g. no further healed training examples are generated, or the machine-learning model achieves a minimum error threshold or error threshold plateau and the like). The method 600 may further comprise deploying the updated compressed machine learning model for replacing a current version of a machine learning model or AI being used with the video game entity.

Example Computer System

Figure 7:
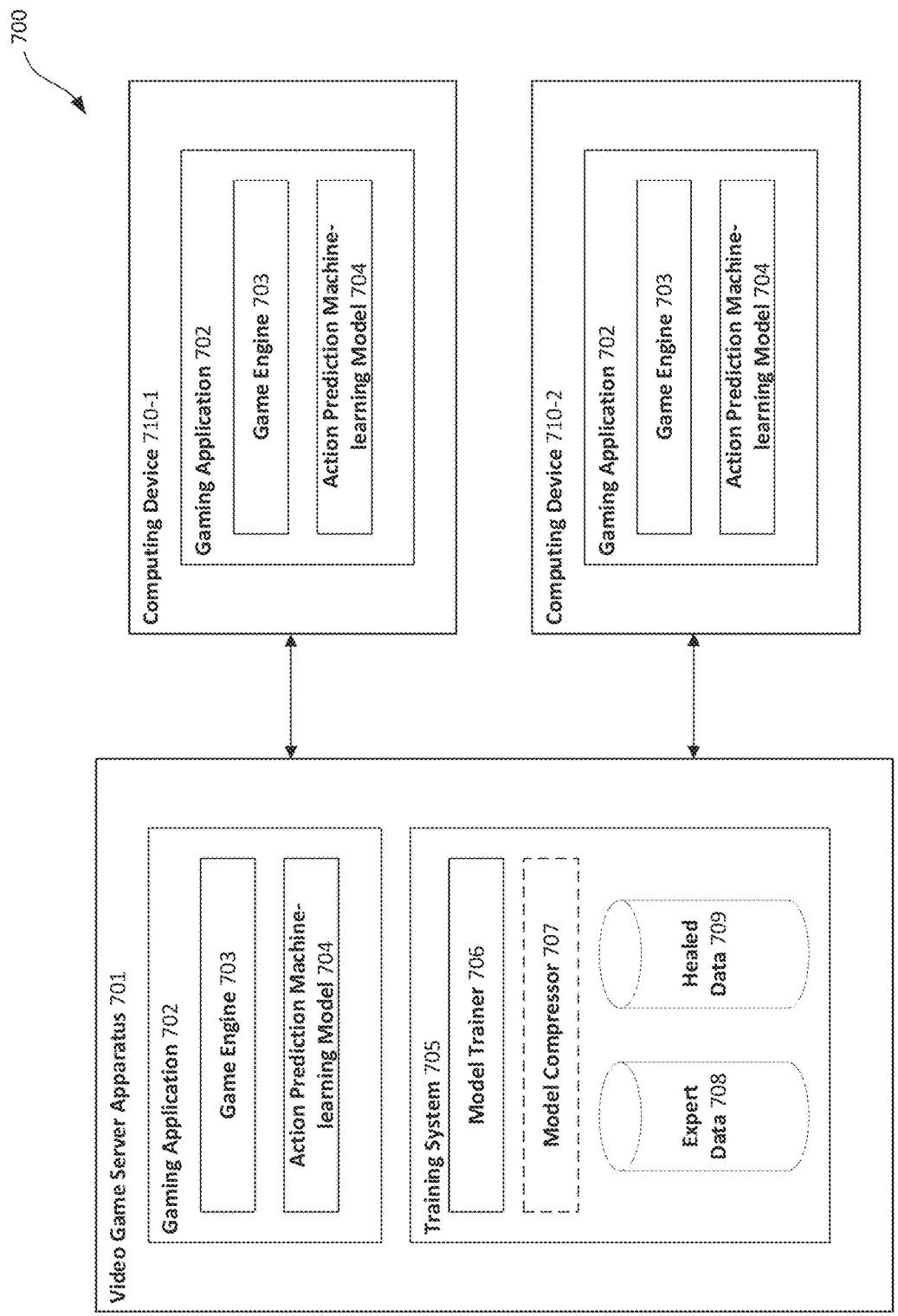
FIG. 7 is a schematic block diagram illustrating an example of a computer system comprising a video game server apparatus and a plurality of computing devices for generating healed data and training an action prediction machine-learning model using the healed data.

FIG. 7 is a schematic block diagram illustrating an example of a computer system 700 comprising a video game server apparatus 701 and a plurality of computing devices 710-1, 710-2 for generating healed data 709 and training an action prediction machine-learning model 704 using the healed data 709.

The computer system 700 includes video game server apparatus 701, and a plurality of client computing devices 710. Each client computing device 710 is operable by a user and provides a client in the form of gaming application 702 to the user. The client computing device 710 is configured to communicate with the video game server apparatus 701, e.g. over a network such as the internet. For the sake of clarity, the computer system 700 is illustrated as comprising a specific number of devices. Any of the functionality described as being performed by a specific device may instead be performed across a number of computing devices, and/or functionality described as being performed by multiple devices may be performed on a single device.

The client computing device 710 can be any computing device suitable for providing the gaming application 702 to the user. For example, the client computing device 710 may be any of a laptop computer, a desktop computer, a tablet computer, a video games console, or a smartphone. For displaying the graphical user interfaces of computer programs to the user, the client computing device includes or is connected to a display (not shown). Input device(s) (not shown) are also included or connected to the client. Examples of suitable input devices include keyboards, touchscreens, mice, video game controllers, microphones and cameras.

Gaming application 702 provides a video game to the user of the client computing device 710. Gaming application 702 includes a game engine 703. The game engine 703 can be configured to execute aspects of the operation of the gaming application 702 according to game rules. Examples of game rules can include rules for scoring, possible inputs, actions/events, movement in response to inputs, and the like. The game engine 703 may receive inputs (provided by a user and/or by other components of the gaming application 702) and determine in-game events, such as actions, jumps, runs, throws, attacks, and other events appropriate for the gaming application 702. During runtime operation, the game engine 703 can read user inputs, in-game data, and game state information to determine the appropriate in-game events.

Furthermore, the game engine 703 is configured to determine the state of a video game environment of the video game as it is being played. For example, in a football video game, the video game environment may be of a particular match being played between two teams. In this example, the state of the video game environment may include the positions of the various football players playing in the match, the position of the ball, a current score of the match, the time in the match (e.g. the amount of game time that has elapsed). The game engine 703 may determine the state of the video game environment of the video game continually (e.g. periodically, such as before the rendering of each video frame).

The gaming application 702 includes an action prediction machine-learning model 704 that has been trained by training system 705 using expert data 708. The action prediction machine-learning model 704 is a machine-learning model configured to generate a prediction for each of one or more actions that a video game entity of the video game environment can perform. For example, where the video game environment is a football match being played, the action prediction machine-learning model 704 may be configured to generate predictions indicating a score for each of one or more passes that a quarterback can make. An action prediction machine-learning model 704 may be configured to generate predictions for each of a plurality of video game entities. Additionally or alternatively, a separate action prediction machine-learning model 704 may be provided for each of one or more video game entities. A video game entity may be any object in the video game environment that is capable of performing actions in the video game environment such as a football player, a fighter, a race car, a spaceship, etc.

The action prediction machine-learning model 704 is any suitable machine-learning model for generating predictions for actions that a video game entity can perform. For example, the action prediction machine-learning model 704 may comprise a neural network comprising a plurality of neural network layers, each neural network layer associated with a set of parameters/weights. The action prediction machine-learning model 704 may be a convolutional neural network comprising a plurality of convolutional layers. Additionally or alternatively, the action prediction machine-learning model 704 may comprise a linear regression model, a logistic regression model, a decision tree, or any other suitable machine-learning model.

The trained action prediction machine-learning model 704 is configured to receive input data comprising a representation of a state of the video game environment. The game engine 703 determines when a prediction is required by the trained action prediction machine-learning model 704, determines the state of the video game environment, and provides data relating to the state of video game environment to the trained action prediction machine-learning model 704 to form the input data.

The input data for the trained action prediction machine-learning model 704 may be provided in the form of a vector of values, with each element of the vector representing a different characteristic of the state of the video game environment. For example, the input data may comprise a vector representation of the position of each of the various video game entities of the video game environment. The positions may be indicated by absolute position (e.g. co-ordinates of the entities with respect to an origin of a co-ordinate system) and/or by relative position (e.g. co-ordinates with respect to a particular entity of the video game environment). Additionally, the input data may comprise further data used for generating predictions for actions. For example, in the case that an action prediction machine-learning model 704 is used to generate predictions for actions for a plurality of video game entities, a selection of a particular video game entity for which action predictions are desired may be provided in the input data. The input data may comprise indicators of the various video game entities of the video game environment (e.g. the particular football players involved in a football match) and/or their characteristics/attributes (e.g. speed, an indication as to their skill, etc.). The input data may comprise data relating to one or more objects of the video game environment, e.g. the position of a ball in a football video game.

The trained action prediction machine-learning model 704 processes the input data and generates an output. The output is a prediction for each of one or more actions that a video game entity can perform. The prediction may be provided in the form of a score for each of the actions that the video game entity can perform. The score may indicate how likely the action is to be successful and/or the utility of performing the action. Additionally or alternatively, the output may indicate a particular action of a set of actions that the trained action prediction machine-learning model 704 has determined as being most suitable for the state of the video game environment.

The game engine 703 causes the video game entity to perform an action in accordance with the prediction(s) generated by the trained action prediction machine-learning model 704. For example, in the case that the trained action prediction machine-learning model 704 generates predictions in the form of scores for actions, a selection of the highest-scoring action may be provided to the game engine 703. Additionally or alternatively, the scored actions may be sampled in accordance with their scores and a sampled action may be selected and provided to the game engine 703. In this example, higher scoring actions may have a higher probability of being selected as the sampled action. As another example, in the case that the trained action prediction machine-learning model 704 provides an output in the form of an indication of a particular action, the particular action is provided to the game engine 703. The game engine 703 causes the video game entity to perform a selected action and determines the state of the video game environment subsequent to the selected action being performed. The predictions made by the trained action prediction machine-learning model 704 and states of the video game environment prior and subsequent to the action being performed are used to generate healed data 709.

Game engine 703 receives a selected action and causes the video game entity to perform the selected action. Subsequently, the game engine 703 determines the state of the video game environment after the video game entity performs the action, and determines whether the performed action was the optimal action for the video game entity to perform in the prior state of the video game environment (i.e. prior to the action being performed). This may be achieved in any suitable manner, such as by the game engine 703 performing one or more non-selected actions and determining the state of the video game environment subsequent to these one or more non-selected actions being performed by the video game entity. In some implementations, a determination that the selected action was suboptimal may be made by the video game engine 703. For example, the video game engine 703 may determine whether the selected action was unsuccessful (e.g. a pass made by a quarterback was intercepted).

Actions determined to be optimal (or successful) and their corresponding predictions are stored as part of the expert data 708, along with the state of the video game environment prior to the action being performed (e.g. the state of the video game environment used to generate the action predictions by the action prediction machine-learning model 704).

Actions determined to be suboptimal (or unsuccessful) and their corresponding scores are used to form healed data 709 which comprises a plurality of healed training examples. Each healed training example also comprises a representation of the state of the video game environment prior to the action of the training example being performed (e.g. the state of the video game environment used to generate the action predictions by the action prediction machine-learning model 704). The prediction generated by the action prediction machine-learning model 704 is adjusted to indicate that the selected action was suboptimal (or unsuccessful). For example, a predicted score for the selected action may be decreased by a certain amount/percentage. A healed training example comprises an adjusted prediction indicating that the performed action was suboptimal/unsuccessful and the state of the video game environment prior to the corresponding action being performed.

The healing/adjustment of predictions to generate healed training examples may be performed either by the client computing device 710, or by the video game server apparatus 701. In implementations where healed training examples are generated by the client computing device 710, the healed training examples are transmitted to the video game server apparatus 701 for inclusion in the healed data 709. Similarly, training examples which did not require healing/adjustment may be transmitted to the video game server apparatus for inclusion in the expert data 708.

In implementations where healed training examples are generated by the video game server apparatus 701, the client computing device 710 transmits a representation of the state of the video game environment prior to the action being performed, and the corresponding prediction generated by the action prediction machine-learning model 704. The client computing device 710 may also transmit an indication that the performed action was suboptimal/unsuccessful, e.g. in the form of a representation of the state of the video game environment subsequent to the action being performed. The video game server apparatus 701 may use the representation of the subsequent state of the video game environment to adjust the received prediction to indicate that the performed action was suboptimal/unsuccessful and form a healed training example for inclusion in the healed data 709. Similarly, training examples which did not require healing/adjustment may be transmitted to the video game server apparatus for inclusion in the expert data 708.

The healed data 709 is used by training system 705 to update the action prediction machine-learning model 704. To train the action prediction machine-learning model 704, the model trainer 706 receives the healed data 709, and optionally, expert data 708, and trains the action prediction machine-learning model 704 to optimize an objective function. For example, the model trainer 706 may train the action prediction machine-learning model 704 to optimize a cross-entropy loss function, a least-squares loss function, or any other suitable loss function and combinations thereof. In general, training the action prediction machine-learning model 704 to optimize an objective function minimizes differences (or errors) between outputs generated by the action prediction machine-learning model 704 from processing training examples of the healed data 709 (and, optionally, healed data 708) and the corresponding scores of the training examples.

In more detail, the action prediction machine-learning model 704 receives one or more training examples from the healed data 709 (and, optionally, the expert data 708). The action prediction machine-learning model 704 processes the one or more training examples in accordance with a current set of parameters (also referred to herein as weights), and generates a predicted output for each of the training examples. The model trainer 706 receives the predicted outputs and performs a comparison between the predicted output of each training example and the score of the performed action of the corresponding training example. The comparison is performed as part of optimizing the objective function that the action prediction machine-learning model 704 is being trained to optimize. Parameters/weights of the action prediction machine-learning model 704 are updated in dependence on the comparison. The parameters of the action prediction machine-learning model 704 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

After the action prediction machine-learning model 704 is updated using healed data 709, the updated action prediction machine-learning model 704 is transmitted to each of the client computing devices 710 for use by the gaming application 702.

In some implementations, the training system 705 may further comprise a model compressor 707 configured to generate a compressed action prediction machine-learning model. As described in greater detail in relation to FIGS. 5 and 6, the model compressor 707 receives a trained action prediction machine-learning model 704 and compresses the model. The compression is achieved by quantizing the weights of the trained action prediction machine-learning model 104 from a higher-bit value (e.g. 64-bits) to a lower bit-value (e.g. 16-bits). The compression may be performed in several stages, e.g. by quantizing the weights from 64-bits to 32-bits, then from 32-bits to 16-bits, etc. Healed data 709 may also be generated using compressed action prediction machine-learning models, as described in relation to FIGS. 5 and 6.

Figure 8:
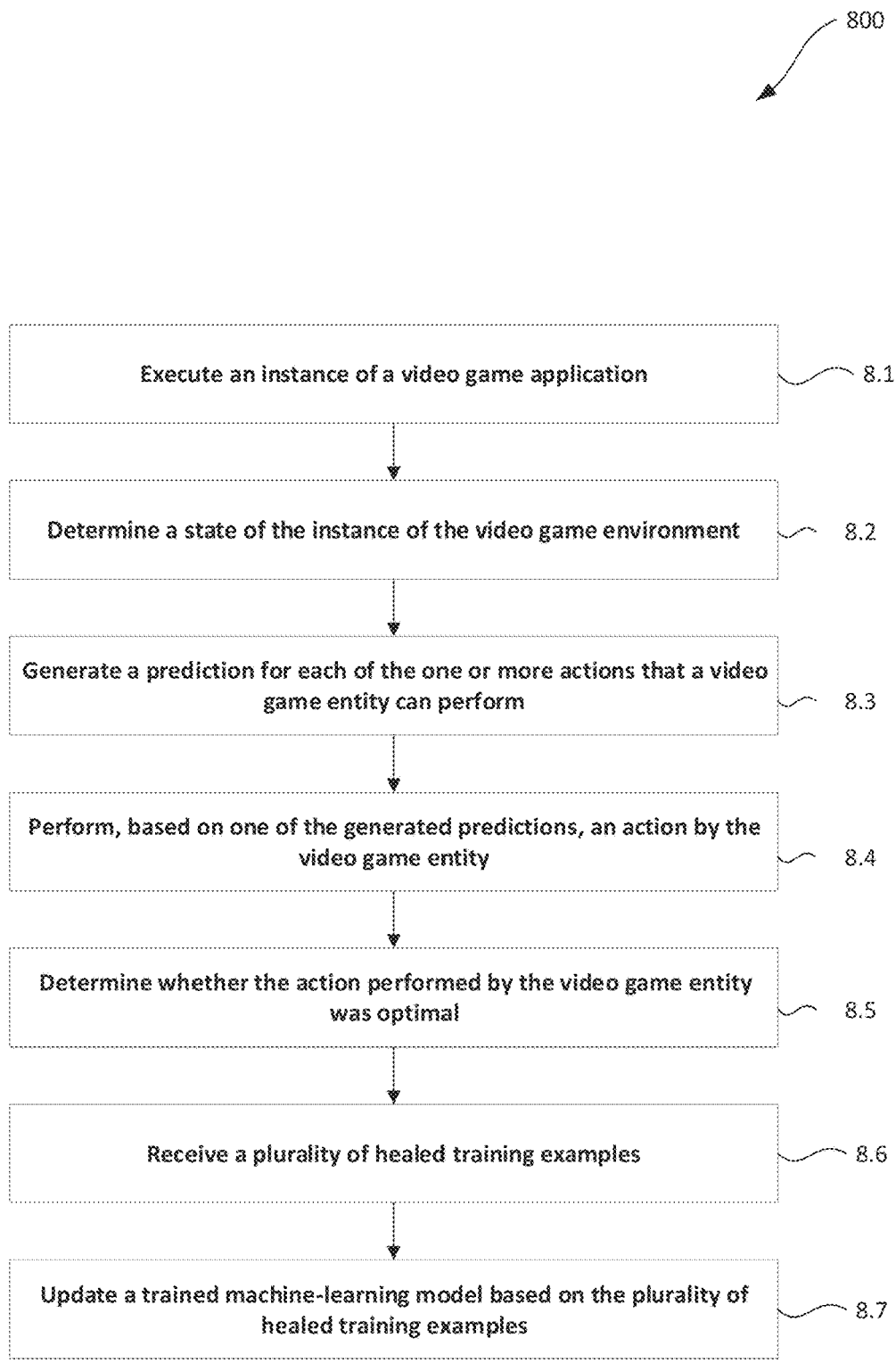
FIG. 8 is a is a flow diagram illustrating an example method using a plurality of computing devices to generate healed training examples for training a machine-learning model.

Example Training Method Using Healed Data Obtained from a Plurality of Computing Devices FIG. 8 is a is a flow diagram illustrating an example method 800 using a plurality of computing devices to generate healed training examples for training a machine-learning model.

In step 8.1, an instance of a video game application is executed on each of the plurality of computing devices.

In step 8.2, a state of the instance of the video game environment is determined at each of the plurality of computing devices.

In step 8.3, at each of the plurality of computing devices, a prediction is generated for each of the one or more actions that a video game entity can perform. This comprises processing input data using a trained machine-learning model associated with the video game entity, wherein the input data comprises a representation of the state of the instance of the video game environment.

The input data may comprise positional information for the video game entity. The input data may further comprise positional information for each of one or more additional video game entities. The generated prediction for each of one or more actions that the video game entity can perform in relation to the state of the instance of the video game environment may comprise a score for the respective action that the video entity can perform.

The machine-learning model may comprise a neural network. For example, the neural network may be a convolutional neural network. The machine-learning model may be trained on the expert data using imitation learning.

In step 8.4, at each of the plurality of computing devices, an action is performed by the video game entity based on one of the generated predictions.

In step 8.5, at each of the plurality of computing devices, a determination is made as to whether the action performed by the video game entity was optimal (or successful).

In step 8.6, a plurality of healed training examples associated with each of the plurality of computing is received at a video game server apparatus. Each healed training example associated with each computing device is generated based on determining that an action performed on said each computing device by the video game entity in relation to the corresponding machine-learning model associated with the video game entity was suboptimal. Each healed training example comprises: (i) the state of the instance of the video game environment on said each computing device prior to the action being performed, and (ii) healed scored action data indicative that the action performed by the video game entity was suboptimal.

Each of the plurality of computing devices may be configured to: in response to determining that the action performed by the video game entity was suboptimal, generate a healed training example, the healed training example comprising: (i) the state of the instance of the video game environment on said each computing device, and (ii) healed scored action data indicative that the action performed by the video game entity for said each computing device was suboptimal. Each of the plurality of computing devices may further be configured to transmit the healed training example to the video game server apparatus.

The video game server apparatus may be configured to: in response to receiving data representative of a determination that the action performed by the video game entity was suboptimal from each of the plurality of computing devices, generate a healed training example, the healed training example comprising: (i) the state of the instance of the video game environment of the video game application on said each computing device, and (ii) healed scored action data indicative that the action performed by the video game entity for said each computing device was suboptimal.

Determining whether the action performed by the video game entity was optimal may comprise determining whether the action performed by the video game entity was successful. The healed training example may be generated based on determining that the action performed by the video game entity was unsuccessful. Generating the healed training example may comprise adjusting the score for the performed action to form the healed scored action data.

In step 8.7, the trained machine-learning model is updated based on the plurality of healed training examples.

The video game application of each computing device may comprise the trained machine-learning model, each trained machine-learning model having the same weight values, prior to being updated based on the plurality of healed training examples, as a trained machine-learning model that is stored as part of the video game server apparatus.

The method 800 may further comprise iteratively collecting a plurality of healed training examples from a plurality of instances of the video game environment of the video game application for each of the computing devices. Updating the machine-learning model may further comprise updating the machine-learning model based on one or more of the collected plurality of healed training examples.

The method 800 may be repeated for each instance of a video game application in which a plurality of healed training examples may be collected and used by the server to update the trained machine-learning model, which may then be subsequently deployed to each of the computing devices. The deployment of the machine learning model from the server to each of the computing devices may be performed based on a scheduled update and the like.

Comparison of Results

Figure 9:
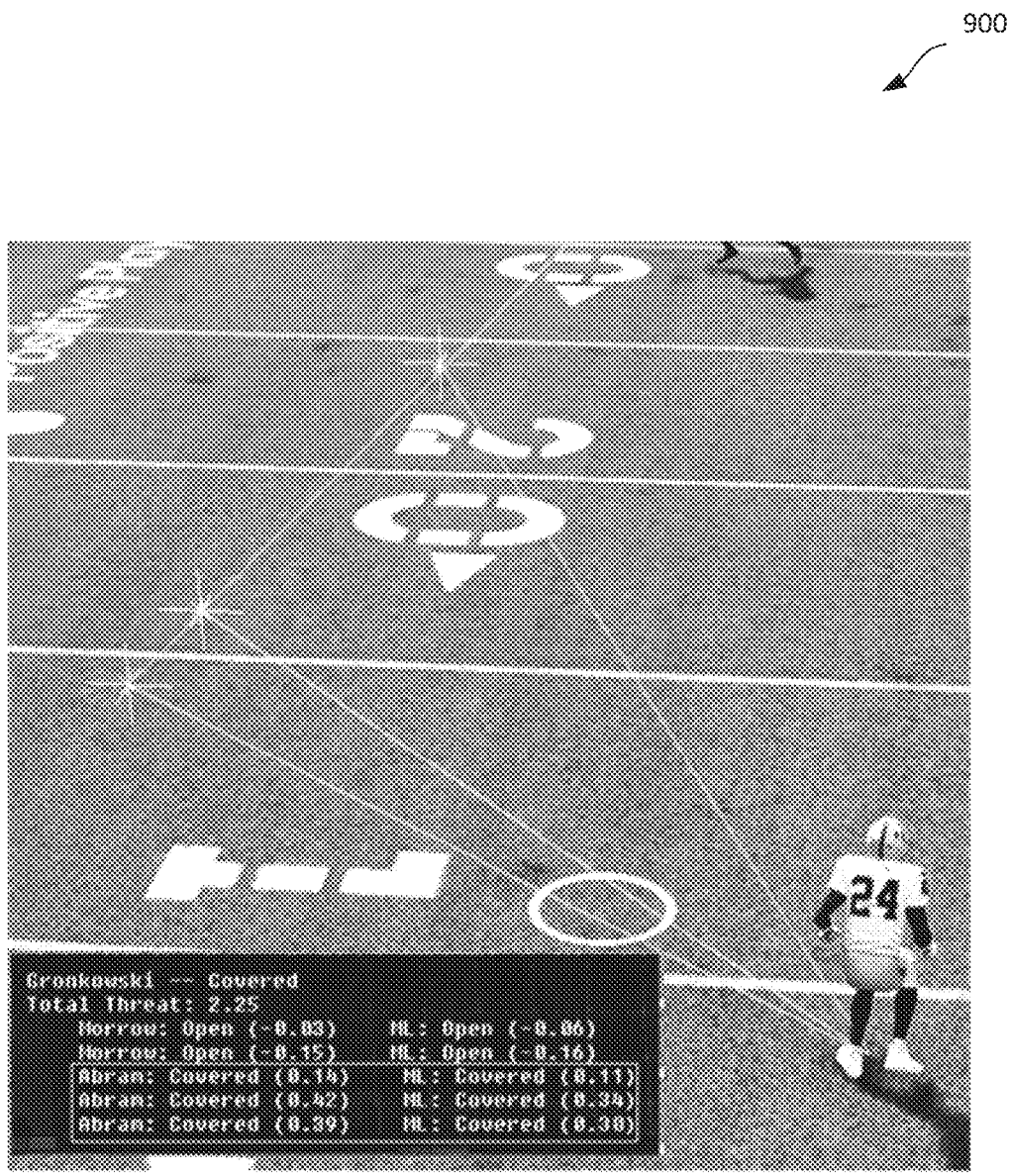
FIG. 9 shows a comparison of results between action predictions generated by a simulation-based AI and action predictions generated by a machine-learning model.

FIG. 9 shows a comparison 900 of results between action predictions generated by a simulation-based AI and action predictions generated by a machine-learning model. In this example, the video game is a football video game, and the video game entity is a quarterback. The left-hand column of the box shows scores obtained from a simulation-based quarterback AI generating scores for various pass options. In this example, a lower value for the score corresponds to a better passing opportunity. The right-hand column shows scores obtained from a trained action prediction machine-learning model, as described by the systems and methods herein. As can be seen by comparing the score values on the left-hand side and the right-hand side, the scores generated by the trained action prediction machine-learning model are close to those generated by the simulation-based quarterback AI. However, as the action prediction machine-learning model has been trained with healed data, the scores generated by the action prediction machine-learning model may be considered to be more reflective of the state of the video game environment. Furthermore, a greater number of pass options may be evaluated while the video game is being played using the trained action prediction machine-learning model than compared to the simulation-based quarterback AI.

Figure 10:
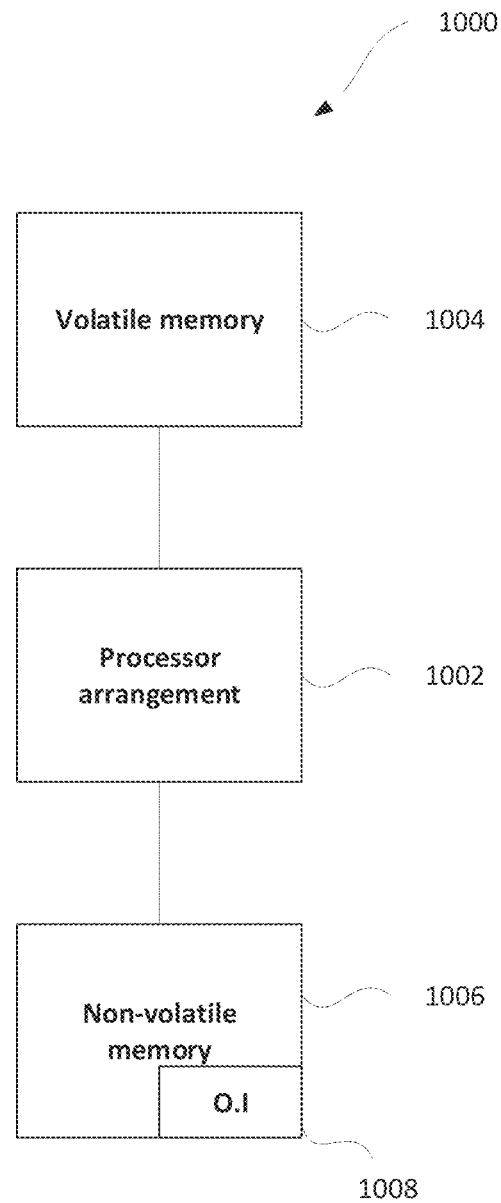
FIG. 10 shows a schematic example of a system/apparatus for performing any of the methods described herein.

FIG. 10 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) moo comprises one or more processors 1002. The one or more processors control operation of other components of the system/apparatus 1000. The one or more processors 1002 may, for example, comprise a general purpose processor. The one or more processors 1002 may be a single core device or a multiple core device. The one or more processors 1002 may comprise a central processing unit (CPU) or a graphical processing unit (GPU). Alternatively, the one or more processors 1002 may comprise specialised processing hardware, for instance a RISC processor or programmable hardware with embedded firmware. Multiple processors may be included.

The system/apparatus comprises a working or volatile memory 1004. The one or more processors may access the volatile memory 1004 in order to process data and may control the storage of data in memory. The volatile memory 1004 may comprise RAM of any type, for example Static RAM (SRAM), Dynamic RAM (DRAM), or it may comprise Flash memory, such as an SD-Card.

The system/apparatus comprises a non-volatile memory 1006. The non-volatile memory 1006 stores a set of operation instructions 1008 for controlling the operation of the processors 1002 in the form of computer readable instructions. The non-volatile memory 1006 may be a memory of any kind such as a Read Only Memory (ROM), a Flash memory or a magnetic drive memory.

The one or more processors 1002 are configured to execute operating instructions 1008 to cause the system/apparatus to perform any of the methods described herein. The operating instructions 1008 may comprise code (i.e. drivers) relating to the hardware components of the system/apparatus moo, as well as code relating to the basic operation of the system/apparatus moo. Generally speaking, the one or more processors 1002 execute one or more instructions of the operating instructions 1008, which are stored permanently or semi-permanently in the non-volatile memory 1006, using the volatile memory 1004 to temporarily store data generated during execution of said operating instructions 1008.

Although the concepts, systems and methods are described above in the context of a football video game, this is by way of example only and is not limiting, it is to be appreciated by the skilled person that the concepts, systems and methods as described herein for generating healed training data and updating/training an action machine learning model may be applied for use with any type of one or more video game entities in any type of video game as the application demands. The updated and/or trained action prediction machine-learning model may be deployed within a video game for use in controlling a video game entity (e.g. a non-player character, vehicle or any other controllable entity) of a video game during game play. Alternatively of additionally, the updated and/or trained action prediction machine-learning model may be deployed within a video game for use in automatically controlling (e.g. automatic targeting, shooting, passing and the like) of one or more parts or portions of a video game entity (e.g. parts of a player character, vehicle or any other controllable entity) of a video game during game play. Alternatively or additionally, the updated and/or trained action prediction machine-learning model may be deployed within a video game for use in providing supplemental action information of a video game entity (e.g. a player character, or a player vehicle, and/or any other entity/asset controlled by a player) of a video game during game play, where the supplementation action information may be used by the player when controlling the player character and/or for automatically controlling one or more parts of a player character or vehicle (e.g. automatic targeting/shooting/passing etc.). The supplemental information may be used to suggest or recommend an action that the video game entity may take by the human player. These predictions may be provided or displayed via the video game entity controlled by each human player for highlighting or recommending, without limitation, the best or optimal action the video game entity may perform and/or provide options such as a ranking the most successful/optimal actions a human player may select for the video game entity to perform. In other embodiments, these predictions may be provided or displayed via a user interface of the video game to a player controlling the video game entity. Similarly, one or more parts of a video game entity (e.g. defense, targeting, attacks, and/or shooting entities of a player spaceship/vehicle/mobile suit) may be controlled by one or more action prediction machine-learning models, where the action prediction machine learning model provides, without limitation, the best or optimal action the corresponding part of the video game entity may perform and/or provide options such as a ranking the most successful/optimal actions a human player may select for the part of the video game entity to perform as the application demands.

Implementations of the methods, apparatus and/or systems as described herein may be realised as in digital electronic circuitry, integrated circuitry, specially designed ASICs (application specific integrated circuits), system-on-chip (SoC) integrated circuitry, computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 10, cause the computer to perform one or more of the methods described herein.

Implementations of the methods, apparatus and/or systems as described herein may be realised as one or more servers, a plurality of servers and/or computing devices, a distributed system, a cloud-based platform and/or cloud computing system and the like. Thus, for instance, several computing devices and/or servers may be in communication by way of a network connection and may collectively perform tasks described as being performed by the methods, apparatus, computing devices, and/or systems as described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

Although the concepts, systems and methods are described above in the context of a gaming application providing a video game, it will be appreciated by the skilled person that the methods and systems described herein may be useful in a variety of software systems and/or applications. For example, healed data may be generated to train action prediction machine-learning models for other computer environments in addition to video game environments, for real-world environments controlled by physical systems, etc. For example, any software system and/or software run time executable could benefit from the concepts, systems and/or methods for training/updating machine learning models using healed training data as described herein. For example, such systems may include one or more entities controllable or monitored by one or more action prediction machine-learning models in which each action prediction machine learning model that is controlling or monitoring a corresponding entity may be updated and/or improved using expert data and/or healed training data based on the methods, systems as described herein. For example operating systems, flight systems, flight simulators, vehicle systems/simulators and/or other embedded devices that run code leveraging AI/machine-learning based systems may be configured to implement the methods, systems and/or concepts as described herein in which such machine-learning based systems may benefit from this imitation learning concept of "healing" training data and being updated with healed training data as described herein when connected to the run time software and/or as the application demands.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer-implemented method comprising:
 receiving an indication that an action performed by a video game entity is suboptimal;
 generating a healed training example, the healed training example comprising:
  (i) a state of an instance of a video game environment comprising the video game entity prior to performing the action, and
  (ii) healed scored action data indicative that the action performed by the video game entity was suboptimal; and
 updating a machine-learning model based on the healed training example.

2. The method of claim 1, wherein the indication is received in response to:
 determining the state of the instance of the video game environment;
 performing, based on one or more predictions generated by the machine-learning model, the action by the video game entity; and
 determining that the performed action is sub-optimal.

3. The method of claim 2, wherein the one or more predictions generated by the machine-learning model comprise a prediction for each of one or more actions that the video game entity can perform in relation to the state of the instance of the video game environment.

4. The method of claim 3, wherein the generated prediction for each of one or more actions that the video game entity can perform in relation to the state of the instance of the video game environment comprises a score for the respective action that the video game entity can perform, and generating the healed training example comprises adjusting the score for the performed action to form the healed scored action data.

5. The method of claim 2, wherein the one or more predictions are generated by processing input data using the machine-learning model, the input data comprising a representation of the state of the video game environment.

6. The method of claim 5, wherein the input data comprises positional information for the video game entity and/or each of one or more additional video game entities.

7. The method of claim 1, wherein the updated machine-learning model is used to control the video game entity to perform actions in the video game environment.

8. The method of claim 1 further comprising, prior to updating the machine learning model based on the healed training example:
training the machine learning model using a plurality of training examples, wherein each training example comprises: (i) game state data representing a state of a video game environment, and (ii) scored action data representing an action and a score for that action if performed by a video game entity of the video game environment subsequent to the state of the video game environment.

9. The method of claim 8, wherein the plurality of training examples are derived from expert data.

10. The method of claim 9, wherein the expert data was obtained from a simulation-based artificial intelligence controlling the video game entity in the video game environment.

11. A non-transitory computer-readable medium comprising instructions, which when executed by a processor, cause the processor to:
receive an indication that an action performed by a video game entity is suboptimal;
generate a healed training example, the healed training example comprising:
(i) a state of an instance of a video game environment comprising the video game entity prior to performing the action, and
(ii) healed scored action data indicative that the action performed by the video game entity was suboptimal; and
update a machine-learning model based on the healed training example.

12. The non-transitory computer-readable medium of claim 11, wherein the indication is received in response to:
determining the state of the instance of the video game environment;
performing, based on one or more predictions generated by the machine-learning model, the action by the video game entity; and
determining that the performed action is sub-optimal.

13. The non-transitory computer-readable medium of claim 12, wherein the one or more predictions generated by the machine-learning model comprise a prediction for each of one or more actions that the video game entity can perform in relation to the state of the instance of the video game environment.

14. The non-transitory computer-readable medium of claim 13, wherein the generated prediction for each of one or more actions that the video game entity can perform in relation to the state of the instance of the video game environment comprises a score for the respective action that the video game entity can perform, and generating the healed training example comprises adjusting the score for the performed action to form the healed scored action data.

15. The non-transitory computer-readable medium of claim 11, wherein the updated machine-learning model is used to control the video game entity to perform actions in the video game environment.

16. A computing system comprising one or more computing devices configured to:
receive an indication that an action performed by a video game entity is suboptimal;
generate a healed training example, the healed training example comprising:
(i) a state of an instance of a video game environment comprising the video game entity prior to performing the action, and
(ii) healed scored action data indicative that the action performed by the video game entity was suboptimal; and
update a machine-learning model based on the healed training example.

17. The computing system of claim 16, wherein the indication is received in response to:
determining the state of the instance of the video game environment;
performing, based on one or more predictions generated by the machine-learning model, the action by the video game entity; and
determining that the performed action is sub-optimal.

18. The computing system of claim 17, wherein the one or more predictions generated by the machine-learning model comprise a prediction for each of one or more actions that the video game entity can perform in relation to the state of the instance of the video game environment.

19. The computing system of claim 18, wherein the generated prediction for each of one or more actions that the video game entity can perform in relation to the state of the instance of the video game environment comprises a score for the respective action that the video game entity can perform, and generating the healed training example comprises adjusting the score for the performed action to form the healed scored action data.

20. The computing system of claim 16, wherein the updated machine-learning model is used to control the video game entity to perform actions in the video game environment.

* * * * *